US011962821B2

(12) United States Patent
Loheide et al.

(10) Patent No.: US 11,962,821 B2
(45) Date of Patent: Apr. 16, 2024

(54) PUBLISHING A DISPARATE LIVE MEDIA OUTPUT STREAM USING PRE-ENCODED MEDIA ASSETS

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: TURNER BROADCASTING SYSTEM, INC., Atlanta, GA (US)

(*) Notice: Subject to any disclaimer, the term of this patent is extended or adjusted under 35 U.S.C. 154(b) by 0 days.

(21) Appl. No.: 17/206,737

(22) Filed: Mar. 19, 2021

(65) Prior Publication Data

US 2021/0211750 A1    Jul. 8, 2021

Related U.S. Application Data

(63) Continuation-in-part of application No. 16/229,310, filed on Dec. 21, 2018, now Pat. No. 11,051,061, (Continued)

(51) Int. Cl.
*H04N 21/234* (2011.01)
*H04N 19/46* (2014.01)
(Continued)

(52) U.S. Cl.
CPC ....... *H04N 21/23439* (2013.01); *H04N 19/46* (2014.11); *H04N 21/2187* (2013.01);
(Continued)

(58) Field of Classification Search
CPC ............... H04L 65/4076; H04L 65/607; H04L 65/4084; H04L 65/605; H04N 21/23439;
(Continued)

(56) References Cited

U.S. PATENT DOCUMENTS 3,751,581 A    8/1973 Sakata et al.
4,500,930 A    2/1985 Hamalainen et al.
(Continued)

FOREIGN PATENT DOCUMENTS

KR    101061952 B1    9/2011

OTHER PUBLICATIONS

Corrected Notice of Allowance for U.S. Appl. No. 15/396,468 dated Apr. 1, 2022.
(Continued)

*Primary Examiner* — Chenea Davis
(74) *Attorney, Agent, or Firm* — ALSTON & BIRD LLP

(57) ABSTRACT

A media content packaging and distribution system that generates a plurality of disparate live media output streams to be viewed on a plurality of consumer devices, receives a programming schedule for a channel from a network scheduler. The programming schedule corresponds to a first manifest associated with a first pre-encoded media asset. Information related to a plurality of media segments from the first pre-encoded media asset indicated in the first manifest is inserted into a live output stream manifest. Transition occurs between first media segments of the plurality of media segments from a first data source to second media segments of the plurality of media segments from a second data source, different from the first data source, where the transition is based on additional information. Based on the transition, a disparate live media output stream is generated for a channel viewable on a consumer device via a media player.

21 Claims, 8 Drawing Sheets

Related U.S. Application Data which is a continuation-in-part of application No. 15/396,475, filed on Dec. 31, 2016, now Pat. No. 11,134,309.

(60) Provisional application No. 62/699,131, filed on Jul. 17, 2018.

(51) Int. Cl.
- *H04N 21/2187* (2011.01)
- *H04N 21/2343* (2011.01)
- *H04N 21/235* (2011.01)
- *H04N 21/262* (2011.01)
- *H04N 21/2668* (2011.01)

(52) U.S. Cl.
CPC ..... *H04N 21/235* (2013.01); *H04N 21/26258* (2013.01); *H04N 21/2668* (2013.01)

(58) Field of Classification Search
CPC ........... H04N 21/2668; H04N 21/8456; H04N 21/26283; H04N 19/46; H04N 21/26241; H04N 21/2181; H04N 21/235; H04N 21/23424; H04N 21/26258; H04N 21/2665; H04N 21/2187
See application file for complete search history.

(56) References Cited

U.S. PATENT DOCUMENTS

| | | | |
|---|---|---|---|
| 5,294,981 A | 3/1994 | Yazolino et al. | |
| 6,229,524 B1 | 5/2001 | Chernock et al. | |
| 6,378,129 B1 | 4/2002 | Zetts | |
| 6,434,621 B1 | 8/2002 | Pezzillo et al. | |
| 6,625,811 B1 | 9/2003 | Kaneko | |
| 6,701,355 B1 | 3/2004 | Brandt et al. | |
| 6,727,914 B1 | 4/2004 | Gutta | |
| 7,051,352 B1 | 5/2006 | Schaffer | |
| 7,337,458 B2 | 2/2008 | Michelitsch et al. | |
| 7,380,262 B2 | 5/2008 | Wang et al. | |
| 7,581,237 B1 | 8/2009 | Kurapati | |
| 7,840,980 B2 | 11/2010 | Gutta | |
| 7,985,134 B2 | 7/2011 | Ellis | |
| 8,005,826 B1 | 8/2011 | Sahami et al. | |
| 8,099,757 B2 | 1/2012 | Riedl et al. | |
| 8,132,203 B2 | 3/2012 | Heer | |
| 8,234,350 B1 | 7/2012 | Gu et al. | |
| 8,455,803 B2 | 6/2013 | Danzer et al. | |
| 8,458,053 B1 | 6/2013 | Buron et al. | |
| 8,533,761 B1 | 9/2013 | Sahami et al. | |
| 8,553,853 B2 | 10/2013 | Middleswarth et al. | |
| 8,572,649 B1 | 10/2013 | Gossweiler et al. | |
| 8,578,042 B2 | 11/2013 | Hu et al. | |
| 8,600,382 B2 | 12/2013 | Hicks, III | |
| 8,631,440 B2 | 1/2014 | Gossweiler et al. | |
| 8,819,726 B2 | 8/2014 | Wetzer et al. | |
| 8,826,443 B1 | 9/2014 | Raman et al. | |
| 8,842,879 B2 | 9/2014 | Laksono et al. | |
| 8,843,965 B1 | 9/2014 | Kurapati et al. | |
| 8,954,521 B1 | 2/2015 | Faaborg et al. | |
| 9,094,639 B2 | 7/2015 | Yim et al. | |
| 9,130,918 B2 | 9/2015 | Picconi et al. | |
| 9,342,668 B2 | 5/2016 | Wang et al. | |
| 9,380,264 B1 | 6/2016 | Vakalapudi | |
| 9,390,447 B1 | 7/2016 | Smith | |
| 10,045,091 B1 | 8/2018 | Nijim et al. | |
| 10,075,753 B2 | 9/2018 | Loheide et al. | |
| 10,586,016 B2 | 3/2020 | Dominick et al. | |
| 10,856,016 B2 | 12/2020 | Loheide et al. | |
| 10,924,804 B2 | 2/2021 | Loheide et al. | |
| 10,965,967 B2 | 3/2021 | Loheide et al. | |
| 10,992,973 B2 | 4/2021 | Loheide et al. | |
| 11,051,061 B2 | 6/2021 | Loheide et al. | |
| 11,051,074 B2 | 6/2021 | Loheide et al. | |
| 11,109,086 B2 | 8/2021 | Loheide et al. | |
| 11,109,102 B2 | 8/2021 | Loheide et al. | |
| 11,134,309 B2 | 9/2021 | Loheide et al. | |
| 11,438,658 B2 | 9/2022 | Loheide et al. | |
| 11,470,373 B2 | 10/2022 | Loheide et al. | |
| 11,477,254 B2 | 10/2022 | Loheide et al. | |
| 11,483,596 B2 | 10/2022 | Loheide et al. | |
| 11,503,349 B2 | 11/2022 | Loheide et al. | |
| 11,546,400 B2 | 1/2023 | Loheide et al. | |
| 11,611,804 B2 | 3/2023 | Loheide et al. | |
| 11,622,143 B2 | 4/2023 | Loheide et al. | |
| 11,665,398 B2 | 5/2023 | Loheide et al. | |
| 11,671,641 B2 | 6/2023 | Loheide et al. | |
| 2002/0038457 A1 | 3/2002 | Numata et al. | |
| 2002/0112239 A1 | 8/2002 | Goldman | |
| 2002/0178447 A1 | 11/2002 | Plotnick et al. | |
| 2003/0023757 A1 | 1/2003 | Ishioka et al. | |
| 2003/0026628 A1 | 2/2003 | Arimoto | |
| 2003/0051239 A1 | 3/2003 | Hudspeth | |
| 2003/0110507 A1 | 6/2003 | Dimitrova et al. | |
| 2003/0126600 A1 | 7/2003 | Heuvelman | |
| 2003/0151538 A1 | 8/2003 | Escobosa et al. | |
| 2003/0182658 A1 | 9/2003 | Alexander | |
| 2003/0212708 A1 | 11/2003 | Potrebic et al. | |
| 2003/0236832 A1 | 12/2003 | McIntyre et al. | |
| 2004/0022278 A1 | 2/2004 | Thomas et al. | |
| 2004/0031056 A1 | 2/2004 | Wolff | |
| 2004/0128682 A1 | 7/2004 | Liga et al. | |
| 2004/0163103 A1 | 8/2004 | Swix et al. | |
| 2004/0172650 A1 | 9/2004 | Hawkins et al. | |
| 2004/0172662 A1 | 9/2004 | Danker et al. | |
| 2005/0015816 A1* | 1/2005 | Christofalo | H04N 21/812 725/35 |
| 2005/0060745 A1 | 3/2005 | Riedl et al. | |
| 2005/0096978 A1 | 5/2005 | Black | |
| 2005/0120369 A1 | 6/2005 | Matz | |
| 2005/0132401 A1 | 6/2005 | Boccon-Gibod et al. | |
| 2005/0135613 A1 | 6/2005 | Brandenburg et al. | |
| 2006/0031889 A1 | 2/2006 | Bennett et al. | |
| 2006/0064730 A1 | 3/2006 | Rael et al. | |
| 2006/0122916 A1 | 6/2006 | Kassan | |
| 2006/0287915 A1 | 12/2006 | Boulet et al. | |
| 2007/0011718 A1 | 1/2007 | Nee, Jr. | |
| 2007/0033419 A1 | 2/2007 | Kocher et al. | |
| 2007/0101361 A1 | 5/2007 | Spielman et al. | |
| 2007/0186228 A1 | 8/2007 | Ramaswamy et al. | |
| 2007/0238035 A1 | 10/2007 | Holscher et al. | |
| 2007/0250901 A1 | 10/2007 | McIntire et al. | |
| 2008/0086742 A1 | 4/2008 | Aldrey et al. | |
| 2008/0201735 A1 | 8/2008 | Sumiyoshi et al. | |
| 2008/0271078 A1 | 10/2008 | Gossweiler et al. | |
| 2008/0271080 A1 | 10/2008 | Gossweiler et al. | |
| 2008/0320513 A1 | 12/2008 | Wong et al. | |
| 2009/0070808 A1 | 3/2009 | Jacobs | |
| 2009/0070819 A1 | 3/2009 | Gajda et al. | |
| 2009/0100452 A1 | 4/2009 | Hudgeons et al. | |
| 2009/0187939 A1 | 7/2009 | LaJoie | |
| 2009/0254934 A1 | 10/2009 | Grammens | |
| 2009/0256972 A1 | 10/2009 | Ramaswamy et al. | |
| 2009/0285217 A1 | 11/2009 | Frink et al. | |
| 2009/0287790 A1 | 11/2009 | Upton et al. | |
| 2010/0010899 A1 | 1/2010 | Lambert et al. | |
| 2010/0125880 A1 | 5/2010 | Roewe | |
| 2010/0146548 A1 | 6/2010 | Yim et al. | |
| 2010/0146559 A1 | 6/2010 | Lee et al. | |
| 2010/0169914 A1 | 7/2010 | Williamson et al. | |
| 2010/0287297 A1 | 11/2010 | Lefebvre | |
| 2010/0293585 A1 | 11/2010 | Xia | |
| 2010/0325655 A1 | 12/2010 | Perez | |
| 2010/0325657 A1 | 12/2010 | Sellers et al. | |
| 2011/0022471 A1 | 1/2011 | Brueck et al. | |
| 2011/0052144 A1 | 3/2011 | Abbas et al. | |
| 2011/0123062 A1 | 5/2011 | Hilu | |
| 2011/0153464 A1 | 6/2011 | Hendricks et al. | |
| 2011/0161500 A1 | 6/2011 | Yengalasetti et al. | |
| 2011/0164115 A1 | 7/2011 | Bennett et al. | |
| 2011/0177775 A1 | 7/2011 | Gupta et al. | |
| 2011/0209181 A1 | 8/2011 | Gupta et al. | |
| 2011/0238754 A1 | 9/2011 | Dasilva et al. | |
| 2011/0246202 A1 | 10/2011 | McMillan et al. | |

(56) References Cited

U.S. PATENT DOCUMENTS

| | | |
|---|---|---|
| 2011/0302601 A1 | 12/2011 | Mayo et al. |
| 2012/0017282 A1 | 1/2012 | Kang et al. |
| 2012/0030011 A1 | 2/2012 | Rey et al. |
| 2012/0110621 A1 | 5/2012 | Gossweiler, III |
| 2012/0143693 A1 | 6/2012 | Chung et al. |
| 2012/0192232 A1 | 7/2012 | Ellis |
| 2012/0271942 A1 | 10/2012 | Walker et al. |
| 2012/0272264 A1 | 10/2012 | Suzuki et al. |
| 2012/0272278 A1 | 10/2012 | Bedi |
| 2012/0284737 A1 | 11/2012 | Savoor et al. |
| 2012/0304223 A1 | 11/2012 | Sargent et al. |
| 2013/0085851 A1 | 4/2013 | Pedro et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gabriele |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | Lafever et al. |
| 2014/0033240 A1 | 1/2014 | Card, II |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0186001 A1 | 7/2014 | Aldrey et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0270338 A1 | 9/2014 | Zhao et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |
| 2015/0106856 A1 | 4/2015 | Rankine |
| 2015/0127845 A1 | 5/2015 | Phillips et al. |
| 2015/0237386 A1 | 8/2015 | Sheehan et al. |
| 2015/0237389 A1 | 8/2015 | Grouf et al. |
| 2015/0249865 A1 | 9/2015 | Oliveira |
| 2015/0256861 A1 | 9/2015 | Oyman |
| 2015/0271234 A1 | 9/2015 | O'Malley et al. |
| 2015/0289022 A1 | 10/2015 | Gross |
| 2015/0381936 A1 | 12/2015 | Goyal et al. |
| 2015/0382042 A1 | 12/2015 | Wagenaar et al. |
| 2015/0382047 A1 | 12/2015 | Van et al. |
| 2015/0382274 A1 | 12/2015 | Logvinov et al. |
| 2016/0029055 A1 | 1/2016 | Mllegas et al. |
| 2016/0063530 A1 | 3/2016 | Lin |
| 2016/0073155 A1 | 3/2016 | Subramaniam et al. |
| 2016/0077710 A1 | 3/2016 | Lewis et al. |
| 2016/0105477 A1 | 4/2016 | Holden et al. |
| 2016/0112740 A1 | 4/2016 | Francisco et al. |
| 2016/0127786 A1 | 5/2016 | Langer |
| 2016/0127788 A1 | 5/2016 | Roberts et al. |
| 2016/0142783 A1 | 5/2016 | Bagga et al. |
| 2016/0150290 A1 | 5/2016 | Chandler et al. |
| 2016/0165306 A1 | 6/2016 | Nam |
| 2016/0182954 A1 | 6/2016 | Nguyen et al. |
| 2016/0198202 A1 | 7/2016 | Van et al. |
| 2016/0227260 A1 | 8/2016 | Hundemer et al. |
| 2016/0255391 A1 | 9/2016 | Noble |
| 2016/0308958 A1 | 10/2016 | Navali et al. |
| 2016/0316247 A1 | 10/2016 | Biagini et al. |
| 2016/0345074 A1* | 11/2016 | Serbest ................ H04L 65/65 |
| 2017/0055012 A1 | 2/2017 | Phillips et al. |
| 2017/0055041 A1 | 2/2017 | Zhu |
| 2017/0064400 A1 | 3/2017 | Riegel et al. |
| 2017/0070789 A1 | 3/2017 | Liassides et al. |
| 2017/0085935 A1 | 3/2017 | Riedel et al. |
| 2017/0099506 A1 | 4/2017 | Grover |
| 2017/0099511 A1 | 4/2017 | Grover |
| 2017/0099525 A1 | 4/2017 | Ray et al. |
| 2017/0118537 A1 | 4/2017 | Stransky-Heilkron et al. |
| 2017/0118538 A1 | 4/2017 | Ashbacher |
| 2017/0164019 A1 | 6/2017 | Oh et al. |
| 2017/0171610 A1 | 6/2017 | Nair et al. |
| 2017/0193544 A1 | 7/2017 | Glasgow et al. |
| 2017/0195718 A1 | 7/2017 | Nair et al. |
| 2017/0201779 A1 | 7/2017 | Publicover et al. |
| 2017/0238035 A1 | 8/2017 | Perez |
| 2017/0257446 A1 | 9/2017 | Bevilacqua et al. |
| 2017/0289597 A1* | 10/2017 | Riedel ................ H04N 21/2183 |
| 2018/0007060 A1 | 1/2018 | Leblang et al. |
| 2018/0048599 A1 | 2/2018 | Arghandiwal et al. |
| 2018/0131986 A1 | 5/2018 | Cole et al. |
| 2018/0165650 A1 | 6/2018 | Kashyape et al. |
| 2018/0184047 A1 | 6/2018 | Simonsen et al. |
| 2018/0285747 A1 | 10/2018 | Bron et al. |
| 2018/0300751 A1 | 10/2018 | Hammitt et al. |
| 2018/0343505 A1 | 11/2018 | Loheide et al. |
| 2018/0367823 A1* | 12/2018 | Brinkley ............ H04N 21/8456 |
| 2019/0068665 A1 | 2/2019 | Kieft et al. |
| 2019/0364317 A1 | 11/2019 | Milford |
| 2019/0380021 A1 | 12/2019 | Meek et al. |
| 2020/0059308 A1 | 2/2020 | Cox et al. |
| 2020/0244778 A1 | 7/2020 | Berookhim et al. |
| 2021/0297740 A1 | 9/2021 | Loheide et al. |

OTHER PUBLICATIONS

Corrected Notice of Allowance for U.S. Appl. No. 15/988,308 dated Jan. 24, 2022.

Corrected Notice of Allowance for U.S. Appl. No. 15/988,308 dated Mar. 2, 2022.

Corrected Notice of Allowance for U.S. Appl. No. 16/985,444 dated Apr. 20, 2022.

Corrected Notice of Allowance for U.S. Appl. No. 16/985,444 dated Mar. 25, 2022.

Corrected Notice of Allowance for U.S. Appl. No. 17/017,145 dated Mar. 4, 2022.

Corrected Notice of Allowance for U.S. Appl. No. 17/038,323 dated Apr. 19, 2022.

Corrected Notice of Allowance for U.S. Appl. No. 17/038,323 dated Feb. 2, 2022.

Corrected Notice of Allowance for U.S. Appl. No. 17/094,102 dated Apr. 20, 2022.

Corrected Notice of Allowance for U.S. Appl. No. 17/094,102 dated Mar. 10, 2022.

Corrected Notice of Allowance for U.S. Appl. No. 17/326,258 dated Apr. 19, 2022.

Corrected Notice of Allowance for U.S. Appl. No. 17/326,258 dated Feb. 25, 2022.

Corrected Notice of Allowance for U.S. Appl. No. 17/326,258 dated Mar. 14, 2022.

Corrected Notice of Allowance for U.S. Appl. No. 17/326,258 dated Mar. 2, 2022.

Final Office Action for U.S. Appl. No. 15/988,572 dated Mar. 10, 2022.

Non-Final Office Action for U.S. Appl. No. 16/854,970 dated Feb. 17, 2022.

Non-Final Office Action for U.S. Appl. No. 16/918,085 dated Mar. 31, 2022.

(56) References Cited

OTHER PUBLICATIONS

Notice of Allowance for U.S. Appl. No. 15/396,468 dated Mar. 18, 2022.
Notice of Allowance for U.S. Appl. No. 16/895,439 dated Mar. 1, 2022.
Notice of Allowance for U.S. Appl. No. 16/902,893 dated Feb. 25, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/017,145 dated Feb. 16, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/340,166 dated Mar. 21, 2022.
Corrected Notice of Allowability for U.S. Appl. No. 16/230,493 dated Jul. 8, 2021.
Corrected Notice of Allowance for U.S. Appl. No. 16/902,775 dated Jul. 30, 2021.
Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Corrected Notice of Allowance for U.S. Appl. No. 16/229,614 dated Jun. 29, 2021.
Final Office Action for U.S. Appl. No. 16/854,970 dated Aug. 18, 2021.
Non-Final Office Action for U.S. Appl. No. 16/918,085 dated Aug. 19, 2021.
Non-Final Office Action for U.S. Appl. No. 15/988,572 dated Aug. 25, 2021.
Non-Final Office Action for U.S. Appl. No. 16/985,444 dated Sep. 3, 2021.
Non-Final Office Action for U.S. Appl. No. 17/038,323 dated Jul. 1, 2021.
Non-Final Office Action for U.S. Appl. No. 17/094,102 dated Sep. 20, 2021.
Notice of Allowance for U.S. Appl. No. 15/988,308 dated Jul. 30, 2021.
Notice of Allowance for U.S. Appl. No. 15/988,492 dated Jul. 30, 2021.
Corrected Notice of Allowance for U.S. Appl. No. 15/986,286 dated May 27, 2021.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/235,445 dated Mar. 26, 2021.
Corrected Notice of Allowance for U.S. Appl. No. 16/236,713 dated May 17, 2021.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Corrected Notice of Allowance for U.S. Appl. No. 16/902,775 dated Jun. 11, 2021.
Final Office Action for U. S. U.S. Appl. No. 15/988,572 dated May 12, 2021.
Non-Final Office Action for U.S. Appl. No. 15/396,468 dated Jun. 1, 2021.
Non-Final Office Action for U.S. Appl. No. 15/988,492 dated Apr. 14, 2021.
Notice of Allowance for U.S. Appl. No. 15/986,451 dated May 5, 2021.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Corrected Notice of Allowance for U.S. Appl. No. 15/986,451 dated Jan. 5, 2022.
Corrected Notice of Allowance for U.S. Appl. No. 15/986,451 dated Nov. 16, 2021.
Corrected Notice of Allowance for U.S. Appl. No. 15/988,308 dated Dec. 22, 2021.
Corrected Notice of Allowance for U.S. Appl. No. 15/988,308 dated Oct. 20, 2021.
Corrected Notice of Allowance for U.S. Appl. No. 15/988,492 dated Dec. 3, 2021.
Corrected Notice of Allowance for U.S. Appl. No. 15/988,492 dated Oct. 20, 2021.
Corrected Notice of Allowance for U.S. Appl. No. 17/326,258 dated Dec. 22, 2021.
Final Office Action for U.S. Appl. No. 15/396,468 dated Dec. 2, 2021.
Final Office Action for U.S. Appl. No. 16/918,085 dated Dec. 8, 2021.
Final Office Action for U.S. Appl. No. 17/038,323 dated Nov. 1, 2021.
Non-Final Office Action for U.S. Appl. No. 17/017,052 dated Dec. 27, 2021.
Non-Final Office Action for U.S. Appl. No. 17/017,145 dated Dec. 22, 2021.
Non-Final Office Action for U.S. Appl. No. 17/017,241 dated Dec. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Acton for U.S. Appl. No. 17/016,789 dated Dec. 21, 2021.
Notice of Allowance for U.S. Appl. No. 16/985,444 dated Jan. 10, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance for U.S. Appl. No. 17/326,258 dated Nov. 17, 2021.
Supplemental Notice of Allowance for U.S. Appl. No. 15/988,492 dated Nov. 9, 2021.
Corrected Notice of Allowance for U.S. Appl. No. 15/396,468 dated Aug. 26, 2022.
Corrected Notice of Allowance for U.S. Appl. No. 15/396,468 dated Oct. 17, 2022.
Corrected Notice of Allowance for U.S. Appl. No. 16/895,439 dated Sep. 14, 2022.
Corrected Notice of Allowance for U.S. Appl. No. 16/902,893 dated Sep. 19, 2022.
Corrected Notice of Allowance for U.S. Appl. No. 17/017,052 dated Aug. 1, 2022.
Corrected Notice of Allowance for U.S. Appl. No. 17/017,145 dated Sep. 15, 2022.
Corrected Notice of Allowance for U.S. Appl. No. 17/017,241 dated Aug. 3, 2022.
Corrected Notice of Allowance for U.S. Appl. No. 17/017,241 dated Oct. 20, 2022.
Corrected Notice of Allowance for U.S. Appl. No. 17/094,102 dated Aug. 3, 2022.
Corrected Notice of Allowance for U.S. Appl. No. 17/094,319 dated Aug. 1, 2022.

(56) References Cited

OTHER PUBLICATIONS

Corrected Notice of Allowance for U.S. Appl. No. 17/094,319 dated Sep. 23, 2022.
Corrected Notice of Allowance for U.S. Appl. No. 17/147,887 dated Oct. 11, 2022.
Corrected Notice of Allowance for U.S. Appl. No. 17/340,166 dated Aug. 22, 2022.
Corrected Notice of Allowance for U.S. Appl. No. 17/340,166 dated Sep. 23, 2022.
Corrected Notice of Allowance for U.S. Appl. No. 17/340,677 dated Oct. 21, 2022.
Final Office Action for U.S. Appl. No. 16/854,970 dated Aug. 18, 2022.
Final Office Action for U.S. Appl. No. 16/918,085 dated Oct. 24, 2022.
Final Office Action for U.S. Appl. No. 17/206,473 dated Sep. 8, 2022.
Non-Final Office Action for U.S. Appl. No. 17/326,281 dated Aug. 18, 2022.
Non-Final Office Action for U.S. Appl. No. 15/988,572 dated Oct. 6, 2022.
Non-Final Office Action for U.S. Appl. No. 17/016,789 dated Sep. 22, 2022.
Non-Final Office Action for U.S. Appl. No. 17/340,538 dated Oct. 3, 2022.
Non-Final Office Action for U.S. Appl. No. 17/408,680 dated Sep. 15, 2022.
Non-Final Office Action for U.S. Appl. No. 17/453,628 dated Sep. 27, 2022.
Notice of Allowance for U.S. Appl. No. 16/854,970 dated Oct. 13, 2022.
Notice of Allowance for U.S. Appl. No. 17/306,758 dated Sep. 16, 2022.
Notice of Allowance for U.S. Appl. No. 17/340,677 dated Aug. 8, 2022.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Corrected Notice of Allowance for U.S. Appl. No. 15/396,468 dated Jun. 24, 2022.
Corrected Notice of Allowance for U.S. Appl. No. 16/985,444 dated Jun. 1, 2022.
Corrected Notice of Allowance for U.S. Appl. No. 17/016,789 dated Jun. 27, 2022.
Corrected Notice of Allowance for U.S. Appl. No. 17/016,789 dated May 18, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,145 dated Jun. 2, 2022.
Corrected Notice of Allowance for U.S. Appl. No. 17/017,145 dated May 17, 2022.
Corrected Notice of Allowance for U.S. Appl. No. 17/038,323 dated May 26, 2022.
Corrected Notice of Allowance for U.S. Appl. No. 17/094,102 dated Jun. 24, 2022.
Corrected Notice of Allowance for U.S. Appl. No. 17/094,102 dated May 17, 2022.
Corrected Notice of Allowance for U.S. Appl. No. 17/094,319 dated Jun. 15, 2022.
Corrected Notice of Allowance for U.S. Appl. No. 17/094,319 dated May 17, 2022.
Corrected Notice of Allowance for U.S. Appl. No. 17/147,887 dated Jul. 22, 2022.
Corrected Notice of Allowance for U.S. Appl. No. 17/147,887 dated May 18, 2022.
Corrected Notice of Allowance for U.S. Appl. No. 17/340,166 dated Jul. 5, 2022.
Corrected Notice of Allowance for U.S. Appl. No. 17/340,166 dated Jun. 2, 2022.
Final Office Action for U.S. Appl. No. 17/017,241 dated Apr. 28, 2022.
Non-Final Office Action for U.S. Appl. No. 17/206,473 dated Jun. 22, 2022.
Non-Final Office Action for U.S. Appl. No. 17/527,817 dated Jun. 15, 2022.
Notice of Allowability for U.S. Appl. No. 16/092,893 dated Jun. 8, 2022.
Notice of Allowability for U.S. Appl. No. 16/895,439 dated Jul. 20, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated Jul. 20, 2022.
Notice of Allowability for U.S. Appl. No. 16/902,893 dated May 13, 2022.
Notice of Allowance for U.S. Appl. No. 17/017,241 dated Jul. 15, 2022.
Notice of Allowance for U.S. Appl. No. 17/326,258 dated Apr. 27, 2022.
Corrected Notice of Allowance for U.S. Appl. No. 16/854,970 dated Jan. 23, 2023.
Corrected Notice of Allowance for U.S. Appl. No. 16/854,970 dated Jan. 5, 2023.
Corrected Notice of Allowance for U.S. Appl. No. 17/017,241 dated Dec. 2, 2022.
Corrected Notice of Allowance for U.S. Appl. No. 17/306,758 dated Dec. 21, 2022.
Corrected Notice of Allowance for U.S. Appl. No. 17/306,758 dated Jan. 5, 2023.
Corrected Notice of Allowance for U.S. Appl. No. 17/326,281 dated Dec. 22, 2022.
Corrected Notice of Allowance for U.S. Appl. No. 17/340,256 dated Feb. 13, 2023.
Corrected Notice of Allowance for U.S. Appl. No. 17/340,256 dated Jan. 6, 2023.
Corrected Notice of Allowance for U.S. Appl. No. 17/340,677 dated Dec. 9, 2022.
Corrected Notice of Allowance for U.S. Appl. No. 17/340,677 dated Nov. 14, 2022.
Corrected Notice of Allowance for U.S. Appl. No. 17/688,666 dated Dec. 14, 2022.
Corrected Notice of Allowance for U.S. Appl. No. 17/688,666 dated Dec. 28, 2022.
Corrected Notice of Allowance for U.S. Appl. No. 17/688,666 dated Feb. 10, 2023.
Corrected Notice of Allowance for U.S. Appl. No. 17/839,882 dated Dec. 23, 2022.
Corrected Notice of Allowance for U.S. Appl. No. 17/858,698 dated Dec. 28, 2022.
Corrected Notice of Allowance for U.S. Appl. No. 17/858,698 dated Jan. 12, 2023.
Final Office Action for U.S. Appl. No. 17/408,680 dated Jan. 12, 2023.
Final Office Action for U.S. Appl. No. 17/408,739 dated Jan. 12, 2023.
Non-Final Office Action for U.S. Appl. No. 17/366,738 dated Dec. 9, 2022.
Non-Final Office Action for U.S. Appl. No. 17/708,241 dated Dec. 20, 2022.

(56) References Cited

OTHER PUBLICATIONS

Non-Final Office Action for U.S. Appl. No. 17/830,587 dated Nov. 25, 2022.
Notice of Allowability for U.S. Appl. No. 17/839,649 dated Jan. 25, 2023.
Notice of Allowance for U.S. Appl. No. 16/918,085 dated Jan. 13, 2023.
Notice of Allowance for U.S. Appl. No. 17/326,281 dated Dec. 7, 2022.
Notice of Allowance for U.S. Appl. No. 17/340,538 dated Jan. 23, 2023.
Notice of Allowance for U.S. Appl. No. 17/830,788 dated Dec. 9, 2022.
Supplemental Notice of Allowance for U.S. Appl. No. 17/527,817 dated Jan. 5, 2023.
Advisory Action for U.S. Appl. No. 17/408,680 dated Mar. 28, 2023.
Advisory Action for U.S. Appl. No. 17/408,739 dated Mar. 28, 2023.
Corrected Notice of Allowance for U.S. Appl. No. 17/340,538 dated Feb. 15, 2023.
Final Office Action for U.S. Appl. No. 15/988,572 dated Apr. 11, 2023.
Non-Final Office Action for U.S. Appl. No. 17/739,885 dated Mar. 30, 2023.
Non-Final Office Action for U.S. Appl. No. 17/742,468 dated Mar. 30, 2023.
Non-Final Office Action for U.S. Appl. No. 18/149,332 dated Apr. 27, 2023.
Notice of Allowance for U.S. Appl. No. 17/708,241 dated Apr. 5, 2023.
Notice of Allowance for U.S. Appl. No. 17/731,049 dated Mar. 2, 2023.
Notice of Allowance for U.S. Appl. No. 17/206,473 dated Mar. 30, 2023.
Notice of Allowance for U.S. Appl. No. 17/453,628 dated Mar. 2, 2023.
Notice of Allowance for U.S. Appl. No. 17/830,587 dated Mar. 9, 2023.
Notice of Allowance for U.S. Appl. No. 17/986,403 dated Apr. 7, 2023.
Final Office Action for U.S. Appl. No. 17/366,738 dated Jul. 20, 2023.
Notice of Allowance for U.S. Appl. No. 18/161,957 dated Jul. 11, 2023.
Non-Final Office Action for U.S. Appl. No. 17/734,704 dated Jun. 21, 2023.
Non-Final Office Action for U.S. Appl. No. 17/970,753 dated Aug. 17, 2023.
Non-Final Office Action for U.S. Appl. No. 18/153,636 dated Jul. 19, 2023.
Non-Final Office Action for U.S. Appl. No. 18/147,421 dated Aug. 17, 2023.
Notice of Allowance for U.S. Appl. No. 17/408,680 dated Jul. 20, 2023.
Notice of Allowance for U.S. Appl. No. 17/408,739 dated Jul. 5, 2023.
Notice of Allowance for U.S. Appl. No. 17/742,468 dated Aug. 15, 2023.
Notice of Allowance for U.S. Appl. No. 18/149,332 dated Aug. 11, 2023.
Notice of Allowance for U.S. Appl. No. 18/157,294 dated Jul. 11, 2023.
Notice of Allowance for U.S. Appl. No. 18/158,202 dated May 25, 2023.
Notice of Allowance for U.S. Appl. No. 18/160,833 dated Jun. 14, 2023.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowability for U.S. Appl. No. 15/986,218 dated Jul. 13, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowability for U.S. Appl. No. 15/986,361 dated May 15, 2020.
Notice of Allowability for U.S. Appl. No. 15/986,361 dated Sep. 30, 2020.
Notice of Allowability for U.S. Appl. No. 16/918,085 dated Mar. 1, 2023.
Notice of Allowance for U.S. Appl. No. 15/396,475 dated Feb. 5, 2021.
Notice of Allowance for U.S. Appl. No. 15/396,624 dated May 31, 2019.
Notice of Allowance for U.S. Appl. No. 15/986,361 dated Apr. 8, 2020.
Notice of Allowance for U.S. Appl. No. 15/986,406 dated Mar. 3, 2021.
Notice of Allowance for U.S. Appl. No. 15/988,241 dated Aug. 26, 2020.
Notice of Allowance for U.S. Appl. No. 15/988,241 dated Mar. 18, 2020.
Notice of Allowance for U.S. Appl. No. 16/128, 104 dated Dec. 12, 2019.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,268 dated Aug. 24, 2020.
Notice of Allowance for U.S. Appl. No. 16/230,493 dated Feb. 12, 2021.
Notice of Allowance for U.S. Appl. No. 16/231,467 dated Apr. 16, 2020.
Notice of Allowance for U.S. Appl. No. 16/234,870 dated Aug. 19, 2020.
Notice of Allowance for U.S. Appl. No. 16/235,445 dated Nov. 4, 2020.
Notice of Allowance for U.S. Appl. No. 16/236,713 dated Nov. 18, 2020.
Notice of Allowance for U.S. Appl. No. 16/902,775 dated Feb. 2, 2021.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Notice of Allowance in U.S. Appl. No. 16/236,673 dated May 1, 2020.
Office Action in U.S. Appl. No. 15/396,453 dated Feb. 27, 2018.
Office Action in U.S. Appl. No. 15/396,475 dated Mar. 29, 2018.
Restriction Requirement for U.S. Appl. No. 16/231,467 dated Feb. 5, 2020.

(56) References Cited

OTHER PUBLICATIONS

Supplemental Notice of Allowance for U.S. Appl. No. 15/986,218 dated Jan. 27, 2021.
Supplemental Notice of Allowance for U.S. Appl. No. 17/527,817 dated Feb. 28, 2023.
Non-Final Office Action dated Aug. 17, 2023, for U.S. Appl. No. 18/147,421, (7 pages), United States Patent and Trademark Office, US.
Final Office Action for U.S. Appl. No. 15/988,492 dated Jan. 6, 2021.
Final Office Action for U.S. Appl. No. 15/988,492 dated May 28, 2020.
Final Office Action for U.S. Appl. No. 15/988,572 dated Jul. 2, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/229,614 dated Jul. 9, 2020.
Final Office Action for U.S. Appl. No. 16/230,268 dated Apr. 17, 2020.
Final Office Action for U.S. Appl. No. 16/234,870 dated Jul. 9, 2020.
Final Office Action for U.S. Appl. No. 16/235,445 dated Sep. 3, 2020.
Final Office Action for U.S. Appl. No. 16/236,713 dated Sep. 30, 2020.
Final Office Action for U.S. Appl. No. 17/206,737 dated Jan. 5, 2023.
Final Office Action in U.S. Appl. No. 15/396,468 dated Jan. 26, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action for U.S. Appl. No. 15/396,468 dated Feb. 4, 2020.
Non-Final Office Action for U.S. Appl. No. 15/396,475 dated Aug. 6, 2020.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 15/986,286 dated Nov. 29, 2019.
Non-Final Office Action for U.S. Appl. No. 15/986,361 dated Jul. 11, 2019.
Non-Final Office Action for U.S. Appl. No. 15/986,406 dated Dec. 18, 2019.
Non-Final Office Action for U.S. Appl. No. 15/986,406 dated Oct. 30, 2020.
Non-Final Office Action for U.S. Appl. No. 15/986,451 dated Apr. 16, 2020.
Non-Final Office Action for U.S. Appl. No. 15/986,451 dated Jun. 27, 2019.
Non-Final Office Action for U.S. Appl. No. 15/988,241 dated Jun. 27, 2019.
Non-Final Office Action for U.S. Appl. No. 15/988,308 dated Dec. 3, 2019.
Non-Final Office Action for U.S. Appl. No. 15/988,308 dated Sep. 8, 2020.
Non-Final Office Action for U.S. Appl. No. 15/988,492 dated Feb. 18, 2020.
Non-Final Office Action for U.S. Appl. No. 15/988,492 dated Sep. 10, 2020.
Non-Final Office Action for U.S. Appl. No. 15/988,572 dated Dec. 27, 2019.
Non-Final Office Action for U.S. Appl. No. 15/988,572 dated Nov. 6, 2020.
Non-Final Office Action for U.S. Appl. No. 16/128,104 dated Aug. 21, 2019.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/229,614 dated Mar. 19, 2020.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/235,445 dated Apr. 2, 2020.
Non-Final Office Action for U.S. Appl. No. 16/236,673 dated Jan. 10, 2020.
Non-Final Office Action for U.S. Appl. No. 16/236,713 dated May 29, 2020.
Non-Final Office Action for U.S. Appl. No. 16/854,970 dated Mar. 17, 2021.
Non-Final Office Action for U.S. Appl. No. 16/902,775 dated Oct. 5, 2020.
Non-Final Office Action for U.S. Appl. No. 17/206,473 dated Dec. 22, 2022.
Non-Final Office Action for U.S. Appl. No. 17/206,737 dated Jun. 23, 2022.
Non-Final Office Action for U.S. Appl. No. 17/206,737 dated Jun. 8, 2023.
Advisory Action for U.S. Appl. No. 15/396,468 dated Jan. 16, 2020.
Advisory Action for U.S. Appl. No. 15/396,475 dated Jun. 3, 2019.
Advisory Action for U.S. Appl. No. 15/396,475 dated May 13, 2020.
Advisory Action for U.S. Appl. No. 15/396,614 dated Oct. 24, 2019.
Advisory Action for U.S. Appl. No. 15/986,218 dated Jul. 12, 2019.
Advisory Action for U.S. Appl. No. 15/986,361 dated Feb. 26, 2020.
Advisory Action for U.S. Appl. No. 15/986,451 dated Feb. 20, 2020.
Advisory Action for U.S. Appl. No. 15/988,308 dated Jul. 16, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice Allowance for U.S. Appl. No. 16/230,268 dated Oct. 9, 2020.
Corrected Notice Allowance for U.S. Appl. No. 16/231,467 dated Oct. 1, 2020.
Corrected Notice of Allowance for U.S. Appl. No. 15/396,453 dated Jun. 3, 2019.
Corrected Notice of Allowance for U.S. Appl. No. 15/396,624 dated Aug. 14, 2019.
Corrected Notice of Allowance for U.S. Appl. No. 15/396,624 dated Sep. 5, 2019.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 15/988,241 dated May 8, 2020.
Corrected Notice of Allowance for U.S. Appl. No. 15/988,241 dated Nov. 18, 2020.
Corrected Notice of Allowance for U.S. Appl. No. 16/128,104 dated Apr. 15, 2020.
Corrected Notice of Allowance for U.S. Appl. No. 16/128,104 dated Jul. 8, 2020.
Corrected Notice of Allowance for U.S. Appl. No. 16/128,104 dated May 20, 2020.

(56) References Cited

OTHER PUBLICATIONS

Corrected Notice of Allowance for U.S. Appl. No. 16/230,268 dated Dec. 2, 2020.
Corrected Notice of Allowance for U.S. Appl. No. 16/231,467 dated Nov. 20, 2020.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Corrected Notice of Allowance for U.S. Appl. No. 16/236,673 dated Oct. 23, 2020.
Corrected Notice of Allowance for U.S. Appl. No. 16/236,673 dated Sep. 21, 2020.
Corrected Notice of Allowance for U.S. Appl. No. 17/306,758 dated Feb. 15, 2023.
Corrected Notice of Allowance for U.S. Appl. No. 16/236,713 dated Apr. 8, 2021.
Corrected Notice of Allowance in U.S. Appl. No. 15/396,453 dated Jun. 13, 2019.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action for U.S. Appl. No. 15/396,468 dated Feb. 10, 2021.
Final Office Action for U.S. Appl. No. 15/396,468 dated Nov. 6, 2019.
Final Office Action for U.S. Appl. No. 15/396,475 dated Feb. 4, 2020.
Final Office Action for U.S. Appl. No. 15/396,614 dated Aug. 12, 2019.
Final Office Action for U.S. Appl. No. 15/986,218 dated Apr. 24, 2019.
Final Office Action for U.S. Appl. No. 15/986,218 dated Jan. 31, 2020.
Final Office Action for U.S. Appl. No. 15/986,286 dated Jun. 9, 2020.
Final Office Action for U.S. Appl. No. 15/986,361 dated Dec. 23, 2019.
Final Office Action for U.S. Appl. No. 15/986,406 dated May 26, 2020.
Final Office Action for U.S. Appl. No. 15/986,451 dated Dec. 16, 2019.
Final Office Action for U.S. Appl. No. 15/986,451 dated Sep. 29, 2020.
Final Office Action for U.S. Appl. No. 15/988,241 dated Jan. 8, 2020.
Final Office Action for U.S. Appl. No. 15/988,308 dated Jan. 28, 2021.
Final Office Action for U.S. Appl. No. 15/988,308 dated May 6, 2020.
Final Office Action for U.S. Appl. No. 15/988,308 dated May 9, 2019.
NonFinal Office Action for U.S. Appl. No. 17/875,775, dated Dec. 7, 2023, (9 pages), United States Patent and Trademark Office, US.

* cited by examiner

PUBLISHING A DISPARATE LIVE MEDIA OUTPUT STREAM USING PRE-ENCODED MEDIA ASSETS

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/229,310, filed on Dec. 21, 2018, which is a Continuation-in-part of U.S. patent application Ser. No. 15/396,475, filed on Dec. 31, 2016, and claims priority to, and the benefit from U.S. Provisional Application Ser. No. 62/699,131, filed Jul. 17, 2018.

This application also makes reference to:
U.S. application Ser. No. 15/988,241, filed on May 24, 2018, now U.S. Pat. No. 10,924,804;
U.S. application Ser. No. 16/229,497, filed on Dec. 21, 2018; and
U.S. application Ser. No. 16/229,614, filed on Dec. 21, 2018.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing a disparate live media output stream using pre-encoded media assets.

BACKGROUND

The past decade has witnessed a massive expansion of live web simulcast services in the field of advertisement-based broadcasting and cable networking systems. Broadcasting platforms usually refer to types of networks that are used to deliver media content to viewers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

Modern web streaming protocols, such as HTTP Live Streaming (HLS) and Dynamic Adaptive Streaming over HTTP (DASH), are implemented to support streaming of live content services, such as DIRECTV NOW$^{SM}$, SLING TV$^{SM}$ and PLAYSTAYION™ VUE, to consumer devices. Traditional service providers, such as COMCAST$^{SM}$, also have set-top boxes capable of receiving both legacy broadcast distribution protocols, as well as modern web streaming protocols. However, such traditional service providers are constrained by the number of broadcast channels they can support on the legacy infrastructure and are more likely to allow more niche-based programming using Internet-based distribution.

Technically, such modern web streaming protocols break media content into numerous small media content segments, typically less than 10 seconds in length. A manifest instructs a media player what media content segments to play next. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

Such modern web streaming protocols support video-on-demand (VOD) assets and a live content as well. The VOD assets prepared for web distribution may have a sequence of short duration segments as well as a manifest that lists all the video segments that make up the full length of the media asset. On the other hand, in case of live content, new short content media segments are made available as soon as they are created. In some protocols, each new segment is added to the manifest while in others the player is provided necessary information to calculate what the next live segment will be. In the latter case, a signal in the media content itself is used to inform the player when they need to re-inspect the manifest for a change in media content.

Typically, in the broadcast industry, a live channel consists of media content that is pre-produced. A live channel requires the creation of an "Air Master" file that is played out, and on which channel branding graphics may be overlaid. The live channel has to be encoded in one more formats that are suitable for broadcast distribution. The live channel thus requires an expensive infrastructure. Further, additional cost is incurred due to providing a secondary encode and packaging to support distribution using the web streaming protocols.

Given the trends toward media content distribution using internet protocols, there is required a system to eliminate the need for a high cost broadcast infrastructure to deliver live channels using existing VOD content assets prepared for web distribution. Thus, an advanced system may be required that provides the network provider with the capability to not only provide new channel offerings in cost-effective manner, but also provide enhanced viewer experience to increase their appeal in order to gain a wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing a disparate live media output stream using pre-encoded media assets, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for publishing a disparate live media output stream using pre-encoded media assets. Various embodiments of the disclosure provide a method and system that simplifies live channel creation, and provides the network provider with the capability to not only provide live channel offerings in cost-effective manner but also provide enhanced viewer experience to increase their appeal in order to gain wider audience.

In accordance with various embodiments of the disclosure, a media content packaging and distribution system or apparatus is provided that generates a plurality of disparate live media output streams to be viewed on a plurality of consumer devices. The media content packaging and distribution system or apparatus receives a programming schedule for a channel from a network scheduler. The programming schedule corresponds to at least a first manifest associated with a first pre-encoded media asset. Information related to a plurality of first media segments and one or more events from the first pre-encoded media asset indicated in the first manifest may be inserted into a live output stream manifest at defined intervals. The defined intervals, at which the insertion of the information related to the plurality of first media segments and the one or more events from the first pre-encoded media asset indicated in the first manifest into the live output stream manifest may be performed, is not greater than a duration of a previous media content segment. A disparate live media output stream, to be viewed by a consumer device for a channel via a media player, is generated based on the insertion of the information related to the plurality of first media segments from the first pre-encoded media asset indicated in the first manifest into the live output stream manifest. The first manifest may correspond to a first data set that includes playlists of reference addresses of the first pre-encoded media asset, information about the first pre-encoded media asset, one or more overlay opportunities, and duration of a first set of non-programing content breaks corresponding to midroll insertion points within one pre-encoded media asset or non-programing content breaks between the first pre-encoded media asset. The disparate live media output stream manifest may correspond to a data set that includes playlists of a plurality of pre-encoded media assets, information about the plurality of pre-encoded media assets, one or more overlay opportunities, and duration of a set of non-programing content breaks within an on-demand media asset or between at least two of the plurality of pre-encoded media assets.

Figure 1A:
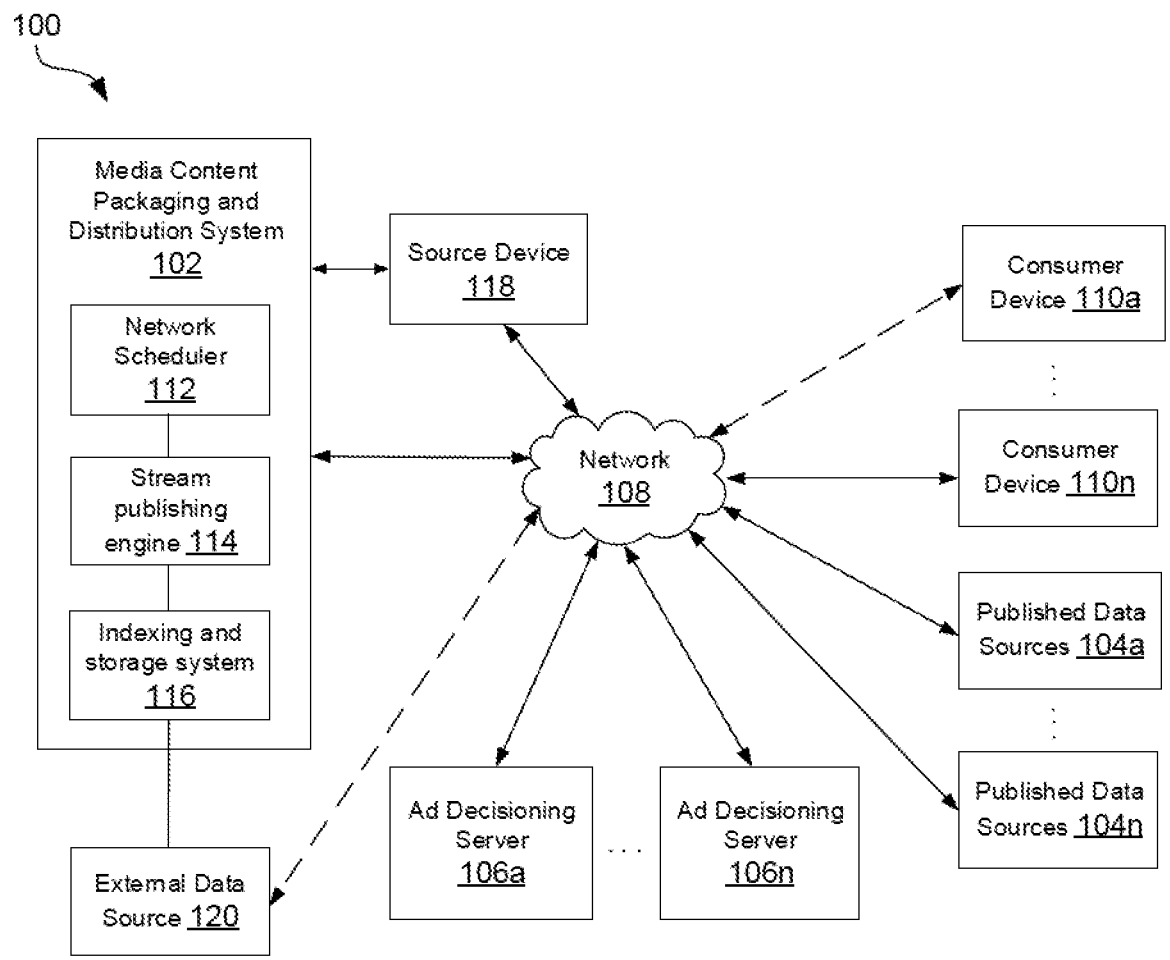
FIG. 1A is a block diagram that illustrates an exemplary system for publishing a disparate live media output stream using pre-encoded media assets, in accordance with an exemplary embodiment of the disclosure.

FIG. 1A is a block diagram that illustrates an exemplary system for publishing a disparate live media output stream using pre-encoded media assets, in accordance with an exemplary embodiment of the disclosure. Referring to FIG. 1A, the system 100, comprises a media packaging and distribution system 102 that is communicatively coupled to published data sources 104a, . . . , 104n, and Ad decisioning servers 106a, . . . , 106n, via a network 108 and/or other programmatic means. There are shown consumer devices 110a, . . . , 110n that are also communicatively coupled to the network 108. The media content packaging and distribution system 102 may comprise at least a network scheduler 112, a stream publishing engine 114, and an indexing and storage system 116. There is also shown a source device 118 communicatively coupled to the network scheduler 112 and the network 108. An external data source 120 is also provided, which is communicatively coupled to the indexing and storage system 116, and the network 108.

The media content packaging and distribution system 102 may comprise suitable logic, circuitry, and interfaces that may be configured to execute code that handles content comprising audio, video, images, metadata, manifests, and/or other data (embedded and/or externally referenced). In other words, the media content packaging and distribution system 102 may provide video programming services to viewers, usually for a subscription fee (such as pay television). The media content packaging and distribution system 102 generates a plurality of disparate live media output streams to be viewed on the plurality of consumer devices 110a, . . . , 110n. The media content packaging and distribution system 102 also handles distribution, for example, multicasting, unicasting, broadcasting, streaming, for one or more channels to be viewed on one or more of the plurality of consumer devices 110a, . . . , 110n. The media content may include a video, an audio, a combination of audio and video presentations, a combination of audio, video, and/or embedded or externally referenced metadata, a combination of multiple-audio, multiple-video, and/or embedded or externally referenced metadata. The media content may also include metadata associated with the audio/video presentation, such as game scores, statistics, or timings, social media, cast/character/credits, geo-spatial data, and/or still-images or graphics (referenced or embedded).

The media content packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel, a plurality of channels, or one or more networks. The broadcast provider may be configured to distribute content via one or more platforms, for example, traditional over-the-air broadcast channels, radio, cable television networks, satellite communication networks, the Internet, and/or other content delivery networks. In other words, the broadcast provider may be configured to execute code that communicates linear video feeds (also referred to as a network television feed or broadcast feed) and corresponding playout schedule to the media content packaging and distribution system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus. The linear video feed may be broadcasted as a multi-program transport stream (MPTS) (also referred to as a live video feed) to the media content packaging and distribution system 102, via the network 108. The MPTS may be distributed over traditional means as the MPTS may receive the schedule and be made aware of blackouts, show overruns or last minute show replacements only. Thus, a corresponding VOD2live channel may be created to provide the various consumer devices with alternative viewing options. The broadcast provider may be owned by (or associated to) a broadcast provider or operator, a network provider or operator, or a content provider or operator.

The media content packaging and distribution system 102 may receive the MPTS, which includes the signaling content and metadata, from the broadcast provider based on current society of cable telecommunication engineers (SCTE) standards (SCTE-35 and SCTE-224) to control web and regional blackouts, network end of day switching, and advertisement insertion. For example, the media content packaging and distribution system 102 may be signaled for various blackout types with in-band SCTE-35 message. Examples of the media content packaging and distribution system 102 may include direct-broadcast satellite (DBS) providers, cable television (CATV) systems, and other wireline video providers and competitive local exchange carriers (CLECs) using IPTV.

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the media content packaging and distribution system 102 via the network 108. The plurality of published data sources 104a, . . . , 104n may provide actual audiences for programs to the indexing and storage system 116. An exemplary published data source may be Nielsen. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106a, . . . , 106n may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of a media asset based on the detected upcoming indicator, such as an inbound trigger, a signaling point, and/or a signal in a source stream by the Ad decisioning servers 106a, . . . , 106n. The Ad decisioning servers 106a, . . . , 106n may receive a request for retrieval of non-programming content, i.e. ads, from a non-programming content proxy server (not shown). Specifically, the Ad decisioning servers 106a, . . . , 106n may receive the request from one or more of the plurality of consumer devices 110a, . . . , 110n, via the non-programming content proxy server (not shown in FIG. 1). The request may be received when one or more indicators and/or pre-encoded place holder content segment for a scheduled duration of one or more non-programming content breaks, as defined by the received programming schedule, are encountered in the disparate live media output stream manifest during media content playout by media players at the one or more of the plurality of consumer devices 110a, . . . , 110n.

Thus, for requests from the plurality of consumer devices 110a, . . . , 110n, based on corresponding disparate live media output stream manifests, the Ad decisioning servers 106a, . . . , 106n may identity the opportunities for the real-time content or advertisement placement activity. In other words, as the advertisement decisioning component of the Ad decisioning servers 106a, . . . , 106n is implemented in a client device, such as one or more of the plurality of consumer devices 110a, . . . , 110n, the Ad decisioning servers 106a, . . . , 106n may identify real-time content or advertisement placement opportunity for dynamic ad insertion. For example, commercial or non-commercial advertisements may be dynamically inserted within program segments of a media feed based on the detected indicator, such as upcoming inbound trigger, signaling point, and/or signal, in the disparate live media output stream manifest by the Ad decisioning servers 106a, . . . , 106n when the advertisement decisioning component is implemented in the client device. In various embodiments, the advertisement decisioning component of the Ad decisioning servers 106a, . . . , 106n may be configured to determine which advertisements, overlay graphics and presentation information to serve to the consumer devices 110a, . . . , 110n based on stream ID, a program ID, a geolocation, time, and any preferences associated with an individual consumer or an advertisement ID specified by the disparate live media output stream manifest.

The network 108 may be any kind of network, or a combination of various networks, and it is shown illustrating the communication that may occur between the Ad decisioning servers 106a, . . . , 106n and the media content packaging and distribution system 102. For example, the network 108 may comprise one or more of a cable television network, the Internet, a satellite communication network, a wide area network (WAN), a medium area network (MAN), and a local area network (LAN). Although the network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110a, . . . , 110n may refer to end-user devices or consumption devices where the content is played and consumed by a user. The number of impressions of a media item, such as an advertisement and/or promotional media, on such plurality of consumer devices 110a, . . . , 110n determine the advertising impact or promotion impact and number of actual audiences achieved during campaigns. Examples of the consumer devices 110a, . . . , 110n may include, but are not limited to connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, embedded devices, or any process/system capable of processing the output for any means, regardless of the capability or intent to decode for media presentation, and on which the consumer may launch a web page, a web application, or a web service to view media content.

The network scheduler 112 may comprise suitable logic, circuitry, and interfaces that may be configured to execute a code that creates and handles a programming schedule of pre-encoded or on-demand media assets for a channel. The programming schedule of the pre-encoded or on-demand media assets for the channel defines which pre-encoded or on-demand media assets should be scheduled, time and duration at which the pre-encoded or on-demand media assets should be played in the generated disparate live media output streams, the ordering of the pre-encoded or on-demand media assets during playout, and when to distribute the media content to the consumer devices 110a, . . . , 110n over the web application, service or page. The network scheduler 112 may create the programming schedule based on a desired theme, content metadata, content rights, content eligibility, and content availability of the pre-encoded or on-demand media assets. The network scheduler 112 may also provide the capability to format non-programming break, such as ad break, durations and locations, as well as graphic overlay locations on the pre-encoded or on-demand media assets displayed on the consumer devices 110a, . . . , 110n. The media content that is distributed may include both the programming content, such as long-form presentations, short-form presentations, news or sporting events, and non-programming content, such as paid advertisements, public service advertisements, or promotional material.

In accordance with an embodiment, the programming schedule may comprise data structures or file formats capable of being processed by a computer, that comprise a reference mapping of different media content items that needs to be utilized by the stream publishing engine 114. In accordance with an embodiment, the network scheduler 112 may receive a programming schedule of an existing channel from the source device 118. The network scheduler 112 may modify the received programming schedule to generate a new programming schedule. The generation of the new programming schedule may be driven by real time or near-real time content context analysis, user-selection on a consumer device, such as the consumer devices 110a, . . . , 110n, or driven by external data received from the external data source 120. In accordance with an embodiment, the network scheduler 112 may modify existing programming schedule to generate a new programming schedule. The generation of the new programming schedule may enable publishing another disparate live media output stream using pre-encoded media assets.

The network scheduler 112, thus, generates an instruction set as the programming schedule for each disparate live media output stream to be generated, and informs the stream publishing engine 114. In accordance with an embodiment, the programming schedule may be a text file or an eXtensible Markup Language (XML) file, which comprises a reference mapping of different media content items or media segments of the pre-encoded media assets.

The stream publishing engine 114 may comprise suitable logic, circuitry, and interfaces that may be configured to execute a code to generate a disparate live media output stream for a new channel to be viewed on a consumer device, in accordance with the specified play schedule, such as the generated new programming schedule. The stream publishing engine 114 may be configured to generate live media output streams by publishing unique streaming live media output stream manifests leveraging different indices created by the indexing and storage system 116 from the various pre-encoded media assets, based on the generated programming schedule. Accordingly, the stream publishing engine 114 may generate a specific live media output stream to be delivered to one or more of the plurality of consumer devices 110a, . . . , 110n over a web page, service or application, based on manipulated manifests. In accordance with an embodiment, the stream publishing engine 114 may be configured to insert media segments that are referenced by manifests associated with a plurality of pre-encoded media assets (stored in the indexing and storage system 116) into a disparate live media output stream manifest. The insertion may be based on intervals equal to a content segment duration to generate a disparate live media output stream for a new channel. The manifest may correspond to a text-based instruction set that may instruct the consumer device 110a, . . . , 110n which and where to acquire the pre-encoded media assets for playout. The disparate live media output stream, thus generated, is in a suitable state (or ready) to be distributed to web media players in one or more of the plurality of consumer devices 110a, . . . , 110n without a requirement to re-encode the pre-encoded media assets before the web distribution of the disparate live media output stream for the new channel.

In this regard, the disparate live media output stream may be tailored for a single consumer device 110a, . . . , 110n, or for a plurality of the consumer devices 110a, . . . , 110n. The decisioning as to which pre-encoded media assets to select for delivery over the network 108 to the one or more of the plurality of consumer devices 110a, . . . , 110n may be based on the manipulation of the manifests that correspond to the programming schedules in real time or near-real time. The manipulation of the manifests may be based on the programming schedules that may be driven by, for example, real time or near-real time content context analysis, user-selection on the consumer devices 110a, . . . , 110n, or external data received from the external data source 120, in addition to the real-time data, such as desired channel theme, content metadata, pre-specified content rights, content availability, content eligibility, and stream operator preferences, received from various databases, as described in detail in FIG. 1B. The stream publishing engine 114 may also be referred to as a stream manipulator that may be configured to insert media segments from live content or pre-stored media content, in an existing program stream, based on manipulation of manifests corresponding to programming schedule of the existing program stream, such as an existing channel. The insertion of live content, pre-stored media content, pre-encoded media assets, and/or the like may be driven by real time or near-real time content context analysis, user-selection on the consumer devices 110a, . . . , 110n, or driven by external data received from the external data source 120. Alternatively, both the live or pre-stored programming content (such as long-form presentations, short-form presentations, news or sporting events) and non-programming content (such as paid advertisements, public service advertisements, or promotional material), may be dynamically scheduled, and inserted to create new channels based on real time or near-real time (or with a certain lag time) manipulation of the manifest corresponding to the programming schedule.

The indexing and storage system 116 may comprise suitable logic, circuitry, and interfaces that may be configured to store references to live content segments, and related metadata stored in the content delivery system 130. The indexing and storage system 116 may be further configured to be ingested with a plurality of manifests associated with the plurality of pre-encoded media assets. The indexing and storage system 116 may also store, process, and generate aggregate viewing information based on various data feeds received from the external data source 120 and the published data sources 104*a*, . . . , 104*n*. In accordance with an embodiment, the indexing and storage system 116 may be configured to ingest the manifests of the pre-encoded media assets, and perform indexing of the listed media segments, indexing of program boundaries and tag markings, advertisement break locations, overlay opportunities credits, digital rights management systems supported in the indexing and storage system 116.

The source device 118 may comprise suitable logic, circuitry, and interfaces that may be configured to communicate available pre-encoded assets to the media content packaging and distribution system 102. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110*a*, . . . , 110*n*. The audience data may include demographics data, audience targeting data, trending data, device type data, device platform data, and content recognition-based data, such as automatic content recognition (ACR)-based data. The trending data comprises information of what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

In operation, the network scheduler 112 may be configured to generate a programming schedule. The programming schedule may comprise at least a first pre-encoded asset (received from the source device 118) based on information, such as a desired channel theme, content metadata, pre-specified content rights, content availability, content eligibility, and stream operator preferences, retrieved from a plurality of databases. The indexing and storage system 116 may retrieve and index the media content assets from the media storage 152 in case the media content assets are not indexed. The stream publishing engine 114 may be configured to receive the programming schedule for the channel from the network scheduler 112. The stream publishing engine 114 may insert information related to a plurality of first media segments and one or more events from the first pre-encoded media asset indicated in the first manifest into a disparate live media output stream manifest at defined intervals. The stream publishing engine 114 may generate the disparate live media output stream based on the insertion of the information related to the plurality of first and/or second media segments from the first and/or the second pre-encoded media assets indicated in the first and/or the second manifests into the disparate live media output stream manifest.

Once the disparate live media output stream manifest is generated and published in the content delivery system, the media player in the consumer device 110*a*, for example, receives the disparate live media output stream manifest and reads information from the disparate live media output stream manifest to acquire the defined media content. In some embodiments, to provide additional personalization and scale, the consumer device 110*a* may receive a higher-level instruction set from the media content packaging and distribution system 102 and perform the manifest manipulation to generate the disparate live media output stream locally.

In accordance with an embodiment, the consumer device 110*a*, for example, may be configured to generate a request to a non-programming content proxy server (such as proxy server 138 described in FIG. 1B) for retrieval of non-programming content. The request may be generated when break indicator and/or pre-encoded place holder content segment for a scheduled duration of one or more non-programming content breaks are encountered in the disparate live media output stream manifest during media content playout by the media player at the consumer device 110*a*. In such cases, the proxy server may generate requests for the Ad decisioning server 106*a*, for example, on behalf of the consumer device 110*a*. The Ad decisioning server 106*a* may determine which ads to serve (may include overlay graphics and presentation information) to the consumer device 110*a* based on stream ID, program ID, geolocation, time, and any preferences associated with an individual consumer device 110*a* or Ad ID. Further, the proxy server may replace the slate content segments with the advertisement content segments, received from the Ad decisioning server 106*a*.

Figure 1B:
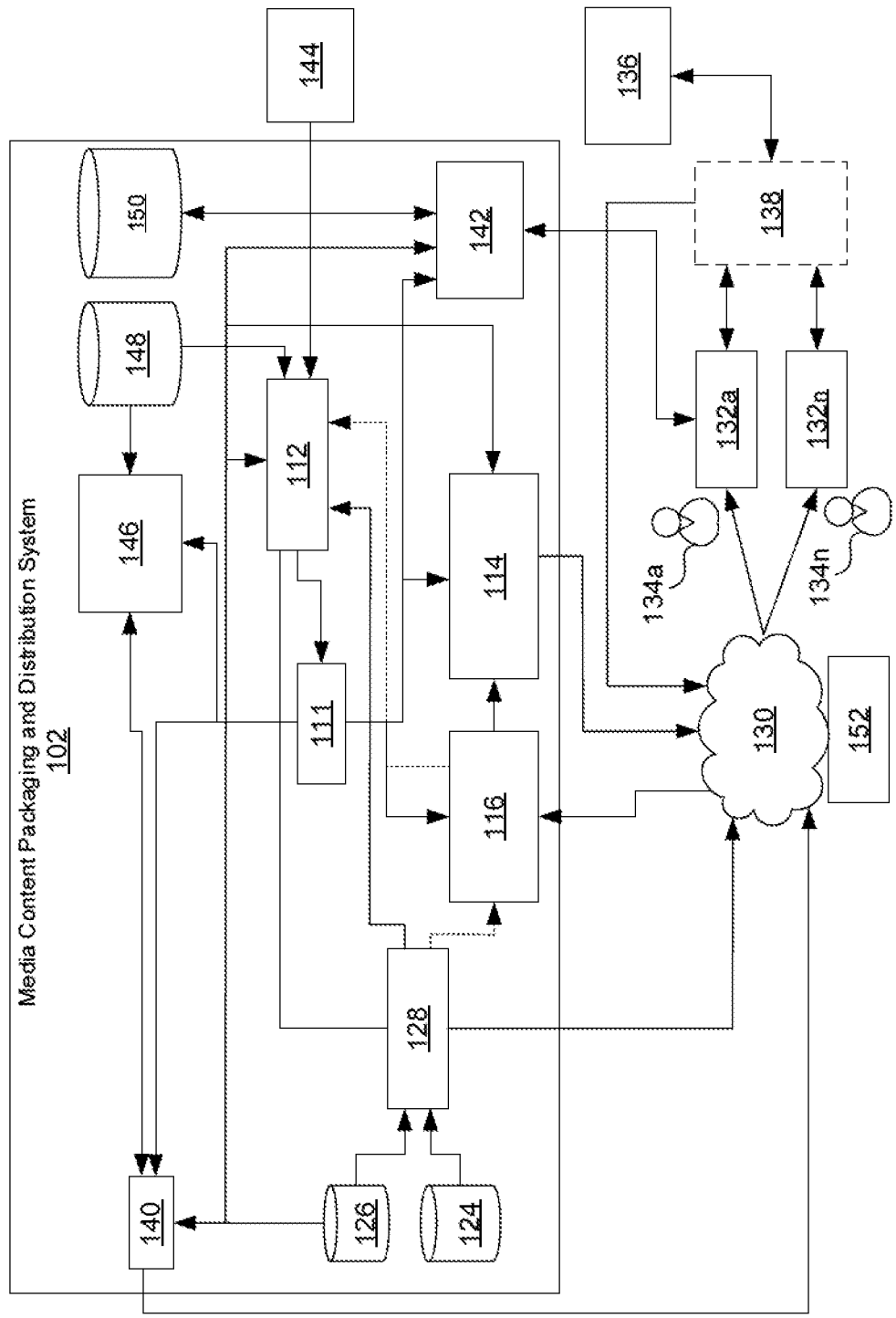
FIG. 1B is a block diagram that illustrates an exemplary media content packaging and distribution system for publishing a disparate live media output stream using pre-encoded media assets, in accordance with an exemplary embodiment of the disclosure.

FIG. 1B is a block diagram that illustrates an exemplary media content packaging and distribution system for publishing a disparate live media output stream using pre-encoded media assets, in accordance with an exemplary embodiment of the disclosure. Referring to FIG. 1B, the media content packaging and distribution system 102 may further comprise a media content master storage system 124, and a media content metadata storage system 126. The media content metadata storage system 126 may include VOD program metadata. The media content master storage system 124, and media content metadata storage system 126 may be coupled with the indexing and storage system 116, via a content encoder packager 128. There are shown the network scheduler 112, the stream publishing engine 114, and the source device 118 provided in the media content packaging and distribution system 102, as described in FIG. 1A. There are also shown a content delivery system 130, which is an example of the network 108, client devices 132*a*, . . . , 132*n*, which correspond to the plurality of consumer devices 110*a*, . . . , 110*n*, and users 134*a* and 134*n* associated with the client devices 132*a* and 132*n*, for example. There are also shown an Ad decisioning server 136 (corresponding to one or more of the Ad decisioning servers 106*a*, . . . , 106*n*), a non-programming content proxy server 138, and a program guide service 140, a stream selection service 142, stream operator preferences 144, an experience control system 146, a content rights storage 148, and a user preferences repository 150. There is further shown a media storage 152 associated with the content delivery system 130.

In some embodiments of the disclosure, the network scheduler 112, the stream publishing engine 114, and the stream selection service 142 may be integrated to form an integrated system. In some embodiments of the disclosure, as shown, the network scheduler 112, the stream publishing engine 114, and the stream selection service 142 may be distinct. Other separation and/or combination of the various entities of the exemplary media content packaging and distribution system 102 illustrated in FIG. 1B may be done without departing from the spirit and scope of the various embodiments of the disclosure.

The media content master storage system 124 may comprise suitable logic, circuitry, and interfaces that may be configured to store master versions of the media content. The master versions may be used as the source for creating the On-Demand or pre-encoded media assets for clients in the required formats.

The media content metadata storage system 126 may comprise suitable logic, circuitry, and interfaces that may be configured to store media content metadata. The media content metadata may include metadata associated with media content segments stored in the media content master storage system 124. Examples of the media content metadata may include a media content identifier, a title of the media content, type of the media content (such as movie series (season episode number)), genre, plot summary, duration, advertisement break locations, credit locations, scene descriptions, a short summary of the media content segments, a short summary of ideal advertisement placements within the content, a file format, digital right management (DRM), encryption information, length of the media content, a date and/or time the media content was added to the catalog of media content, a new item indicator for the media content (e.g., a new media asset that became available within the last 24 hours, last few days, last week, and/or the like), a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 126 may also store program-specific information (PSI) data as defined by ISO/IEC 13818-1 (MPEG-2), closed captioning data, and subtitles associated with the media content segments stored in the media content master storage system 124. Other forms of metadata may be utilized without departing from the spirit and scope of the various embodiments of the disclosure.

The content encoder packager 128 may comprise suitable logic, circuitry, and interfaces that may be configured to execute code to determine a package that includes media content and associated metadata. The content encoder packager 128 may be directly coupled to the indexing and storage system 116. Thus, the content encoder packager 128 encodes and packages the media content into the required on-demand formats for delivery to the client devices 132a and 132n. The media content may correspond to one or more of the plurality of media segments transcoded to different types of streams for different types of devices, such as a TV or a mobile device, and marked with Nielson markers. Based on such a package, a corresponding media content distribution device may dynamically generate one or more encoded content assets for playout to one or more players communicatively coupled through the content delivery system 130.

The content encoder packager 128 may be configured to publish the one or more encoded content assets in real-time or near real-time. The content encoder packager 128 may be operable to create "C3" content assets and clips that may be made available before content roles out of the media content packaging and distribution system 102. The content encoder packager 128 may also be configured to provide near-real time redundancy. The resulting converted output, i.e. one or more encoded content assets, that is generated by the content encoder packager 128 may be communicated to the indexing and storage system 116 which may be communicatively coupled with the plurality of client devices 132a, . . . , 132n. The content encoder packager 128 may also support a robust interface (e.g. application data interface (ADI)) that defines the on-demand duration of the individual segments as well as encryption requirements and a service type to link for ad insertion. In accordance with an embodiment, the content encoder and packager 128 may publish content to the media storage 152 on the content distribution system 130.

The content delivery system 130 may correspond to the network 108. The content delivery system 130 may comprise networks configured for distributing media content. Generally, the term "content," "metadata," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The content delivery system 130 may comprise media storage 130a. The content delivery system 130 may be configured to provide media content to the plurality of client devices 132a, . . . , 132n via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132a, . . . , 132n may correspond to consumer devices 110a, . . . , 110n. In accordance with an embodiment, the client devices 132a, . . . , 132n may be content recognition-enabled devices, such as automatic content recognition devices. The client devices 132a, . . . , 132n may be configured to communicate with the Ad decisioning server 136 and/or the non-programming content proxy server 138, via the content delivery system 130, or a separate communication network. For example, the client devices 132a and 132n may be associated with users 134a and 134n, respectively.

The Ad decisioning server 136 may comprise suitable logic, circuitry, and interfaces that may be configured to execute code to determine which advertisements, overlay graphics and presentation information to serve to the client devices 132a, . . . , 132n based on a stream ID, a program ID, a geolocation, time, and preferences associated with an individual users 134a, . . . , 134n, or advertisement ID.

The non-programming content proxy server 138 may comprise suitable logic, circuitry, and interfaces that may be configured to execute code to communicate with the client devices 132a, . . . , 132n. In accordance with an embodiment, the non-programming content proxy server 138 may receive requests from the client devices 132a, . . . , 132n when the client devices 132a, . . . , 132n generate requests for the Ad decisioning server 136 whenever the client devices 132a, . . . , 132n encounter an advertisement break tag or an overlay tag. In other words, the client devices 132a, . . . , 132n may call the non-programming content proxy server 138 to initiate the media stream. At stream set-up, any ad ID and information from the client devices 132a, . . . , 132n is passed to the non-programming content proxy server 138. The non-programming content proxy server 138 receives the manifest from the content delivery system 130 and decodes the indicators for non-programing content. The non-programming content proxy server 138 then calls the Ad decisioning server 136 and replaces the non-programing content media segments in the manifest and then delivers the manifest to the client devices 132a, . . . , 132n along with any data about the ads. Further, the non-programming content proxy server 138 may replace the slate content segments with the advertisement content segments.

The program guide service 140 may comprise suitable logic, circuitry, and interfaces that may be configured to execute code to provide a time accurate listing of which programming content is currently playing on each of the generated channels and broadcast channels as well as if experiences, like program restart, are available for a program.

The stream selection service 142 may comprise suitable logic, circuitry, and interfaces that may be configured to communicate a notification of a recommended media item to a consumer device, for example, the client device 132a. The notification may be communicated to seek a confirmation from a user, such as the user 134 associated with the client device 132a, to display the recommended disparate live media output stream on the client device 132a. The stream selection service 142 may further receive an input that corresponds to the confirmation from the user 134 associated with the client device 132a to display the recommended disparate live media output stream on the client device 132a, and further communicate the received input to the network scheduler 112 and the stream publishing engine 114. The stream selection service 142 may be further configured to receive user-preferences from the plurality of consumer devices 110a, . . . , 110n. In accordance with an embodiment, the stream selection service 142 may be configured to receive an input that corresponds to user-selections on the plurality of client devices 132a, . . . , 132n, such as the client device 132a, over the network 108. The stream selection service 142 acts as an interface between the network scheduler 112 and the stream publishing engine 114 of the media content packaging and distribution system 102 and the plurality of client devices 132a, . . . , 132n, such as the client device 132a. Thus, the stream selection service 142 may provide the client devices 132a and 132n requesting to view respective disparate live media output stream with the correct stream variant(s) based on the geolocation and identification of the users 134a and 134n, along with the programming schedules, content rights, and user preferences information.

The stream operator preferences 144 may comprise suitable logic, circuitry, and interfaces that may be configured to execute code to provide content parameters, for example, content parameters indicating the types of channels to be generated (theme, genre, title, and the like), the number of advertisement breaks per hour, duration of such advertisement breaks, whether to insert advertisements between episodes, is a network logo required to be displayed and if so, then how often.

The experience control system 146 may comprise suitable logic, circuitry, and interfaces that may be configured to execute code to implement a system that is based on content rights to allow individual clients to access the underlying pre-encoded content to enable services, such as restating a program from the beginning or moving forward in the programming schedule to a different programming content.

The content rights storage 148 may comprise suitable logic, circuitry, and interfaces that may be configured to execute code to store a set of rules governing when and how media content may be used. For example, when the media content may be made available On-Demand, if the media content may be made available over the Internet, whether the media content may be used in a disparate live media output stream and the timeframe, or is the user allowed to restart the media content when live streamed.

The user preferences repository 150 may comprise suitable logic, circuitry, and interfaces that may be configured to execute code to index of previous content selections of the users 134a and 134n for both live and pre-encoded programing that may be used to personalize and organize the user experience going forward.

In operation, in accordance with an embodiment, a new client device, such as the client device 132a, may generate a request for a disparate live media stream output and transmit the request to the media content packaging and distribution system 102. The request may be automatically generated when the client device 132a selects the broadcast channel or access the brand portal. In response to the generated request, the network scheduler 112 may be configured to generate a programming schedule 111 for the disparate live media stream output for the client device, such as the client device 132a. The network scheduler 112 may be configured to generate the programming schedule 111 comprising at least a first pre-encoded asset based on information, such as a desired channel theme, content metadata, pre-specified content rights, content availability, content eligibility, and stream operator preferences 144, explicitly provided by the user 134a at the client device 132a.

In accordance with another embodiment, when the client device 132a is an already subscribed client device, The network scheduler 112 may be configured to generate the programming schedule 111 comprising at least a first pre-encoded asset based on information, such as a desired channel theme, content metadata, pre-specified content rights, content availability, content eligibility, and stream operator preferences 144, retrieved from a plurality of databases, such as the stream operator preferences 144, the experience control system 146, the content rights storage 148, and the user preferences repository 150.

The programming schedule 111 may correspond to manifests, such as a first and a second manifest, associated with pre-encoded media assets, such as a first pre-encoded media asset and a second pre-encoded media asset, desired by the user, such as the user 134a, associated with the client device 132a. Such generated programming schedule 111 may be provided various other systems, such as the indexing and storage system 116, the stream publishing engine 114, the stream selection service 142, and the program guide service 140.

In an alternate embodiment, the stream selection service 142 may be configured to provide the requesting client device 132a with a correct stream variant of the disparate live media stream output based on the geolocation and identification of the client device 132a, along with the schedules, rights, and preferences information, retrieved from the plurality of databases, such as the stream operator preferences 144, the experience control system 146, the content rights storage 148, and the user preferences repository 150.

In another alternate embodiment, the stream selection service 142 may be configured to present a list of disparate live media output streams or recommend one of the lists of disparate live media output streams associated with the generated disparate live media output stream to the client device 132a for user selection. The presentation and/or the recommendation may be based on a combination of one or more programing schedules, genre, demographics, geolocation of the client device 132a, type or category of the client device 132a, a time of viewing, individual user preferences based on previous selections and association of a plurality of disparate live media output streams with corresponding broadcast channels or brand portals.

In accordance with an embodiment, in response to the request generated by a new client device 132a, the network scheduler 112 may determine that a first pre-encoded media asset (required for the generation of the disparate live media stream output) is already transmitted to the content delivery system 130 and thus, the first pre-encoded media asset is available for media distribution. In such case, the first pre-encoded media asset may be used without the cost or time required for content encoding and packaging. In accordance with an embodiment, the network scheduler 112 may require the first pre-encoded media asset for nearly immediate turn around. In such an embodiment, the network scheduler 112 may communicate with the indexing and storage system 116 to determine whether the first pre-encoded media asset was already processed and available for immediate output.

In accordance with another embodiment, the network scheduler 112 may determine that the first pre-encoded media asset is not available in the content delivery system 130 for media distribution. In such an embodiment, the content encoder packager 128 may be configured to retrieve the media content assets from the media content master storage system 124 based on the received programming schedule 111 of the channel from the network scheduler 112. The media content master storage system 124 may be configured to store master versions of the media content assets which may be utilized to create pre-encoded media assets for client devices 132a, . . . , 132n in required formats. Various media container formats of the media content assets may include, but are not limited, transport stream (TS), fragmented MP4 (fMP4), Common Media Application Format (CMAF) and the like.

The content encoder packager 128 may be configured to retrieve metadata, such as duration of the media content assets, duration and location of one or more non-programming content breaks, credits, and overlay opportunities, corresponding to the retrieved media content assets from the media content metadata storage system 126. Other examples of the metadata may include, but are not limited to, title and type of media content assets, such as season episode number of a movie series, genre, plot summary, duration, ad break locations, credit locations, and scene descriptions.

For encoding and the packaging, the content encoder packager 128 may be configured to mark locations of the one or more non-programming content breaks and conditioning the media assets such that the locations of the one or more non-programming content breaks are adjacent to boundaries of the plurality of first media segments. Based on the content metadata, in case the one or more indicators are not included in the first pre-encoded media asset at packaging time, the content encoder packager 128 may be configured to insert one or more indicators to mark the credits and overlay graphics locations in the media content assets.

Once the content encoder packager 128 has encoded and packaged the media content assets and retrieved the associated metadata corresponding to the media content assets for media distribution, the content encoder packager 128 may be further configured to generate corresponding media content manifests. The media content manifests may correspond to data sets, such as text-based instruction sets, that may be utilized by the client device 132a to determine which media segments to play and storage locations of such media segments. Various formats of the media content manifests or playlist, may be, but are not limited DASH and HLS. In accordance with an embodiment, the content encoder packager 128 may be further configured to add in-band indicators in the media content assets. The in-band indicators may indicate markers corresponding to location of the one or more non-programming content breaks, credits, and overlay graphic locations for one or more protocols that may be utilized to determine next media content asset to be downloaded.

The indexing and storage system 116 may be configured to retrieve manifests of the media content assets from the media storage 152 in case the media content assets are not indexed. In such case, the indexing and storage system 116 may perform indexing by ingesting the manifests associated with the media assets enlisted in the programming schedule 111, indexing the plurality of media segments from the manifests, storing the data log of the plurality of indicators indicating non-programing content breaks, program start, program end, and graphic overlays included in the media assets, and validating the completion of the media assets.

Once indexed, the stream publishing engine 114 may be configured to receive the programming schedule 111 for the channel from the network scheduler 112. The stream publishing engine 114 may be further configured to insert information related to the plurality of first media segments and one or more events from the first pre-encoded media asset indicated in the first manifest into the disparate live media output stream manifest at defined intervals. The defined intervals may be intervals at which the insertion of the information related to the plurality of first media segments and the one or more events from the first pre-encoded media asset indicated in the first manifest into the disparate live media output stream manifest is performed, is not greater than a duration of a previous media content segment.

In other words, at the schedule time, the stream publishing engine 114 may be configured to generate the disparate live media output stream manifest by inserting a new media segment from the scheduled pre-encoded media asset into the disparate live media output stream manifest on an interval not greater than the previous content segment duration. For certain protocols, the insertion may only be required at media content breaks for ads or transitions to the next pre-encoded media asset. The stream publishing engine 114 may be further configured to insert one or more overlay indicators, which are independent of the first pre-encoded media asset, at defined time stamps in the generated disparate live media output stream based on the received programming schedule 111. The stream publishing engine 114 may be further configured to support a plurality of digital rights management indicators in the first manifest, and may include one or more of a program start, a program end, content or context change indicator, a break indicator, an overlay indicator in the generated disparate live media output stream based on one or more events in the first manifest, the received programming schedule 111, or metadata associated with the first pre-encoded media asset.

Accordingly, the stream publishing engine 114 may be configured to generate the disparate live media output stream. The disparate live media output stream manifest may correspond to a data set that includes playlists of a plurality of pre-encoded media assets, information about the plurality of pre-encoded media assets, one or more overlay opportunities, and duration of a set of non-programing content breaks within one on-demand media asset or between at least two of the plurality of pre-encoded media assets.

Such disparate live media output streams may be generated with very low investment and provide consumers more choice without having to search through a large catalog of the pre-encoded media assets. A sense of easy availability and immediacy provided by live viewing may be created. The perceived time commitment associated with selecting pre-encoded media assets and enables the user, such as the user 134a, to fill time may be overcome. Further, discovery and sampling of new media content is also simplified when there limited time to select and watch an entire program On-Demand. The proposed idea has also made it easy to "tune-in" to watch favorite parts of a programming content, and also provides an ad supported sampling of media content in the disparate live media output stream for a subscription OTT service offering. The generated disparate live media output stream for the channel provides a plurality of viewing options to a consumer associated with the client device, such as the client device 132a. The plurality of viewing options corresponds to a genre-based channel (such as e.g. 80s movies, film noir, romantic comedies, mysteries), a demographic channel (such as toddlers, young girls, teen boys, young adults), a marathon or binge channel (such as running a loop of all the episodes of a particular series or the previous season before the new season starts), a themed channel (such as collection of baseball movies around opening day, collection of holiday episodes of genre-based programing around that holiday) or a collection of short clips (such as collection of "weird" news stories, financial news, latest news headlines, user generated content, comedy shorts).

In accordance with an embodiment, the media content packaging and distribution system 102 may be configured to loop the programming schedule based on stream operator preferences. Each asset in the programming schedule confirming to pre-defined content rights of the looped program schedule may be verified. The generated disparate live media output stream for the channel may provide a plurality of viewing options to the client device 132a associated with the user 134a. The plurality of viewing options may correspond to a genre-based channel, a marathon or binge channel, a themed channel, or the like. An exemplary embodiment is described in detail in FIGS. 4A to 4D.

In accordance with an embodiment, the media content packaging and distribution system 102 may be configured to support a plurality of profiles presented in the first pre-encoded media asset into the generated disparate live media output stream. The plurality of profiles may include at least one or more resolutions or one or more bitrates. The pre-encoded media assets that may have slightly different profile variations may be mapped based on when, or how such pre-encoded media assets were used to generate the disparate live media output stream.

In accordance with another embodiment, the media content packaging and distribution system 102 may be further configured to maintain accurate program timing for the generated disparate live media output stream. In accordance with yet another embodiment, the media content packaging and distribution system 102 may be further configured to provide a plurality of viewing options to a consumer associated with the client device, such as the client device 132a, through a plurality of disparate live media output streams for the channel. For example, multiple variants of the disparate live media output streams associated with a broadcast channel, such as Cartoon Network, may be young female version of Cartoon Network, toddler version of Cartoon Network, young adult version of Cartoon Network, or even a marathon of all episodes of a popular program. The plurality of viewing options corresponds to a genre-based channel, a marathon or binge channel, or a themed channel. The client, upon requesting to view a disparate live media output stream, may be presented with a list of such variant associated with disparate live media output streams by the stream selection service 142. If the user preferences are already known by the stream selection service 142, the client device, such as the client device 132a, may be provided with a filtered list of options or previously selected precise stream version.

In accordance with yet another embodiment, the media content packaging and distribution system 102 may be further configured to recommend the generated disparate live media output stream for viewing based on one or more of genre information, demographic information related to the programming schedule 111, geolocation of the plurality of client devices, such as the client devices 132a, . . . , 132n, and individual user preferences.

In accordance with yet another embodiment, the media content packaging and distribution system 102 may be further configured to send the program guide service 140 an update to keep the program guide service 140 in sync with what is playing, when there is a change in the schedule, such as one program ends, and a new program begins, or an ad break is inserted. Such communication may be more frequent if there is a desire to provide more accurate accounting of the schedule so as to precisely determine the remaining duration of the current program. In other words, As-Run data for each active generated disparate live media output stream may be provided to the program guide service 140 service to correct any timing discrepancies between the original programming schedule 111 and what content is actually playing at a given time.

In accordance with an embodiment, the media content packaging and distribution system 102 may enable the consumer device 110a with various capabilities. For example, the consumer device 110a may be enabled to be personalized corresponding to viewing preference of the generated disparate live media output stream based on the first pre-encoded media asset, linked to the first pre-encoded media asset upon joining the generated disparate live media output stream with a programming content in progress and an intent to start the programming content from beginning based on verified media content rights.

In accordance with an embodiment, the media content packaging and distribution system 102 may present a playlist or a plurality of disparate live media output streams to the consumer device 110a. The presented playlist may comprise next episodes of the programming content to play upon completion of an episode selected for programming content restart, move forward in time in a program guide, based on pre-specified content rights and business rules of a stream operator, and play an upcoming programming content via a link to the first pre-encoded media asset. In accordance with another embodiment, the presented a playlist or the plurality of disparate live media output streams may comprise the next episodes to play after the episode selected to jump ahead to view, and download, based on verified media content rights, the first pre-encoded media asset for offline consumption in case a user is still viewing the media content in the generated disparate live media output stream.

The media content packaging and distribution system 102 may be configured to offer the consumer device 110a a choice of disparate live media output streams by identifying generated live media output streams associated with a traditional broadcast channel or brand and present them to the consumer device 110a when the consumer device 110a selects the broadcast channel or access the brand portal. Based on the selection, the media content packaging and distribution system 102 logs the user selection in an individual user preferences database, for example, the user preferences repository 150, to be used in an automated decision process to select the most appropriate content from that brand on a going forward basis. In accordance with an embodiment, such user preferences repository 150 may be accessed by the stream selection service, as described in FIG. 1B. In accordance with another embodiment, the media content packaging and distribution system 102 may be further configured to determine which of the generated disparate live media stream output or traditional live stream should be joined by the consumer device 110a, based on a combination of genre or demographic information for the programming schedules provided by the network scheduler 112, geolocation of the consumer device 110a, time, and individual user preferences based on previous selections. In accordance with yet another embodiment, the media content packaging and distribution system 102 may be further configured to provide a filtered list of options for a plurality of disparate live media output streams based on a combination of the programming schedules provided by the network scheduler 112, geolocation of the consumer device 110a, time, and individual user preferences based on previous selections.

Figure 2:
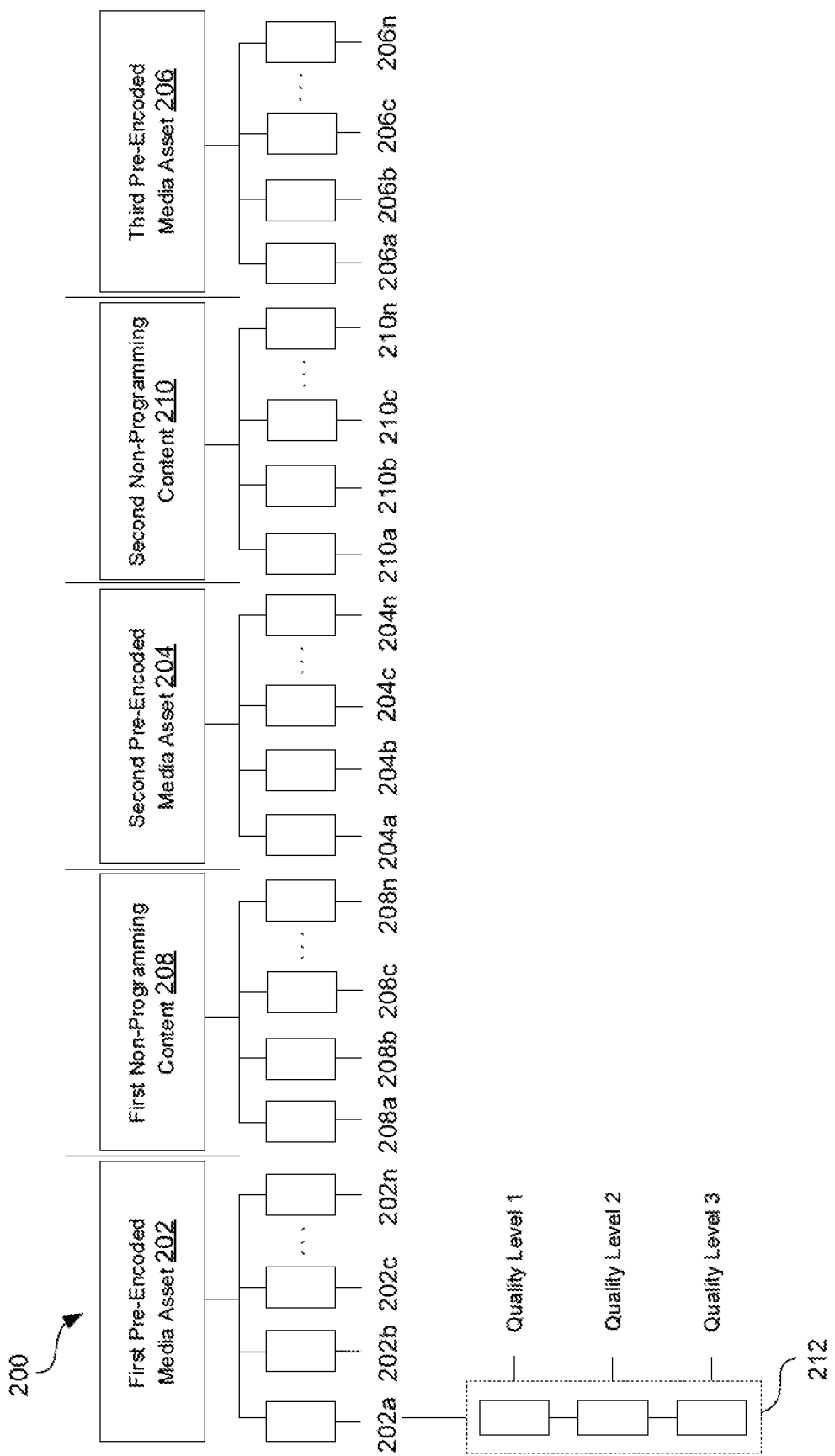
FIG. 2 illustrates segmentation of pre-encoded media content in a framework for publishing a disparate live media output stream using pre-encoded media assets by the media content packaging and distribution system of FIG. 1B, in accordance with an exemplary embodiment of the disclosure.

FIG. 2 illustrates segmentation of pre-encoded media content in a framework for publishing a disparate live media output stream using pre-encoded media assets by the media content packaging and distribution system of FIG. 1B, in accordance with an exemplary embodiment of the disclosure. FIG. 2 also illustrates an exemplary arrangement of pre-encoded media assets in accordance with a programming schedule 111. Referring to the exemplary arrangement of FIG. 2, there are shown a first pre-encoded media asset 202, a second pre-encoded media asset 204, and a third pre-encoded media asset 206. There are also shown a first non-programming content item 208 placed after the first pre-encoded media asset 202, and a second non-programming content item 210 placed after the second pre-encoded media asset 204. Each of the pre-encoded media assets 202, 204, and 206 may be a pre-encoded On-Demand content item, and may be stored in the media content metadata storage system 126 in segments or other forms. For example, the first pre-encoded media asset 202 may be segmented into a plurality of first media segments 202a, 202b, 202c, ..., 202n. Similarly, the second pre-encoded media asset 204 and the third pre-encoded media asset 206 may also be segmented into a plurality of second media segments 204a, 204b, 204c, ..., 204n, and a plurality of third media segments 206a, 206b, 206c, ..., 206n respectively.

By way of example, the segmentation may be executed by a segmenting system (not shown) during a preparation stage of the media assets. In accordance with an embodiment, all the segments of the plurality of first media segments 202a, 202b, 202c, ..., 202n, the plurality of second media segments 204a, 204b, 204c, ..., 204n, and the plurality of third media segments 206a, 206b, 206c, ..., 206n, may be segmented into consistent length, for example, 10 seconds segments. It may be advantageous to have a consistent and smaller size segments to be able to quickly push to the content delivery system 130, and also for quick downloading by a media player at the end-user side, such as on the plurality of consumer devices 110a, ..., 110n.

During the preparation stage of the media assets, an optimum size (or length) of segments may be determined by the segmentation system based on various factors, such as resolution and bitrate of a consumer device. Smaller chunks or segments of pre-encoded media assets may be difficult to manage as metadata associated with them may increase, whereas larger chunks or segments may be difficult to communicate by the media content packaging and distribution system 102 and also to be downloaded by the media player so as to maintain an adequate buffer for consistent streaming and playback at the media player. Thus, an optimal size of segments may be determined. It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the media assets arranged, as shown, live content segments may be arranged after, in between, or prior to a media asset (e.g. VOD content segments) or a non-programming content item. The insertion of the live content segments may be done on-the-fly based on dynamic scheduling and manifest manipulation. The insertion of live content, pre-stored media content, pre-encoded media assets, and/or the like, may be driven by real time or near-real time content context analysis, user-selection on the consumer devices 110a, ..., 110n, or driven by external data received from the external data source 120. The network scheduler 112 in association with the stream publishing engine 114 (also referred to as a stream manipulator) may be configured to insert live content or pre-stored media content, in an existing program stream based on manipulation of a manifest of an existing pre-encoded media asset, such as an existing channel. In accordance with an embodiment, the content encoder packager 128 may encode the media content to the various desired bit rates and resolutions (for example, quality levels). The content encoder packager 128 may then segment the media content into short segments, applies DRM, and creates a manifest. For a pre-encoded media asset, the segmentation may be in real terms, for example individual 10 second files, or in virtual terms, for example a long file but the manifest may point to short ranges within the file—i.e. 10 seconds for the consumers to download. The media content may be encoded to the desired quality levels and stored back to the media content master storage system 124 with metadata defining the created profiles stored in the media content metadata storage system 126. When the pre-encoded media asset is requested, the pre-encoded media asset may be packaged (and segmented) in real-time. Thus, the encoding and packaging by the content encoder packager 128 may be performed at different times.

In accordance with an embodiment, each segment of the plurality of first media segments 202a, 202b, 202c, ..., 202n, the plurality of second media segments 204a, 204b, 204c, ..., 204n, and the plurality of third media segments 206a, 206b, 206c, ..., 206n, may be further processed to be stored at various quality levels, and content encryption modes for the purposes of adaptive bitrate streaming and Digital Rights Management, for example, the media segment 202a may be stored in a plurality of quality levels, for example, high definition (HD), high dynamic range (HDR) video, or different quality levels in accordance with specified pixel resolutions, bitrates, resolutions, bandwidths, frame rates, and/or sample frequencies. As each of the media assets, such as the master pre-encoded media assets 202 to 206, are stored in the media content master storage system 124 and the associated metadata is stored in the media content metadata storage system 126. The plurality of first media segments 202a, 202b, 202c, . . . , 202n, the plurality of second media segments 204a, 204b, 204c, . . . , 204n, and the plurality of third media segments 206a, 206b, 206c, . . . , 206n, may be stored in the media storage 152 of the content delivery system 130 after being processed by the content encoder packager 128. The pre-encoded media assets may be re-used to create new channels, such as new program streams, without requiring to re-encode a selected media asset.

For the sake of brevity, and with reference to FIG. 2, there is shown an example of media packaging for adaptive streaming using certain protocols or streaming methods for at least one delivery method of the distribution system. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed on one or more of the plurality of consumer devices 110a, . . . , 110n, based on at least the profile, desired delivery method, delivery conditions, and content protection requirements, to satisfy operational and technical requirements, as needed. The operational and technical requirements may include, but are not limited to, media encoding, media segmentation, programming schedule 111 (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for a same media asset may not be required. Further, based on different operational and technical requirements, media packaging or the arrangement of media assets or other content in a program stream may be different. The media content that is prepared and distributed may include both the programming content, such as long-form presentations, short-form presentations, news or sporting events; and non-programming content, such as paid advertisements, public service advertisements, or promotional material.

Currently, dedicated encoders, such as physical encoders, are used to encode each program stream before distribution or transmission (i.e. before a distribution of a program stream of a channel). Such dedicated encoders are not only costly but also limit ability of a broadcast provider to swap or change content dynamically in a program stream as each content item needs to pass through such dedicated encoders for transmission. In other words, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time. In accordance with the various embodiments of the present disclosure, the media content packaging and distribution system 102 provides the capability to dynamically schedule and manipulate manifest of a pre-encoded media asset, and insert the programming and non-programming content in the existing pre-encoded media asset streamed on a channel into a disparate live media output stream manifest to be directly delivered over a web distribution system (such as one or more delivery methods) to be viewed on one or more consumer devices 110a, . . . , 110n. The disparate live media output stream in which the new media item is inserted may not be required to pass through the dedicated encoders before delivery over the network 108, such as the content delivery system 130.

Figure 3:
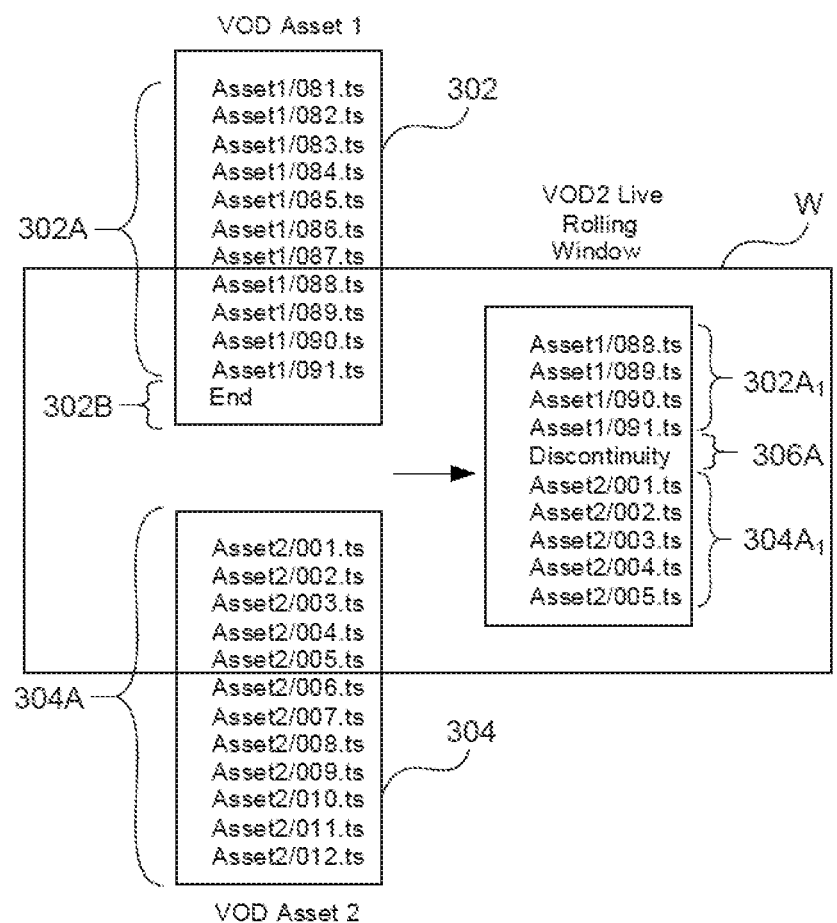
FIG. 3 illustrates a first exemplary scenario associated with publishing of a disparate live media output stream using two pre-encoded media assets by the media content packaging and distribution system of FIG. 1B, in accordance with an exemplary embodiment of the disclosure.

FIG. 3 illustrates a first exemplary scenario associated with publishing of a disparate live media output stream using two pre-encoded media assets by the media content packaging and distribution system of FIG. 1B, in accordance with an exemplary embodiment of the disclosure. Referring to the exemplary scenario of FIG. 3, there are shown a first pre-encoded media asset manifest 302, a second pre-encoded media asset manifest 304, and a disparate live media output stream manifest 306.

The first pre-encoded media asset manifest 302 and the second pre-encoded media asset manifest 304 may be pre-encoded On-Demand content items listed in the programming schedule 111, and retrieved from the content delivery system 130. The format of the first pre-encoded media asset manifest 302 and the second pre-encoded media asset manifest 304 may be, for example, DASH, HLS, or other such format. Further, the format of a first pre-encoded media asset and a second pre-encoded media asset corresponding to the first pre-encoded media asset manifest 302 and the second pre-encoded media asset manifest 304, respectively, may be TS, fMP4, CMAF, or other such format.

The first pre-encoded media asset manifest 302 is shown to be including a plurality of first media segments 302A and an end tag 302B. The second pre-encoded media asset manifest 304 is shown to be including a plurality of second media segments 304A.

The stream publishing engine 114 may be configured to insert information related to the plurality of first media segments 302A and one or more events, i.e. end tag 302B, indicated in the first pre-encoded media asset manifest 302. The stream publishing engine 114 may be further configured to insert information related to the plurality of second media segments 304A, indicated in the second pre-encoded media asset manifest 304. The stream publishing engine 114 may be configured to insert such information in the disparate live media output stream manifest 306 at defined intervals. The stream publishing engine 114 may be configured to insert additional information, such as but are not limited a discontinuity tag 306A, in the disparate live media output stream manifest 306 to facilitate an integrated media player of the client device 132a to transition smoothly between media content from different sources, i.e. the first pre-encoded media asset and the second pre-encoded media asset. Thereafter, the stream publishing engine 114 may publish the disparate live media output stream manifest 306 in the content delivery system 130.

The client device, such as the client device 132a, receives the manipulated manifest, i.e. the disparate live media output stream manifest 306, from the content delivery system 130, and the integrated media player may read information from the disparate live media output stream manifest 306 to acquire the defined media content. As illustrated in FIG. 3, the integrated media player may read information from the disparate live media output stream manifest 306 in a rolling window W to acquire the defined media content, such as one or more first segments $302A_1$ from the first pre-encoded media asset and one or more second segments $304A_1$ from the second pre-encoded media asset. Accordingly, the user 134a associated with the client device 132a may view the disparate live media output stream generated based on the disparate live media output stream manifest 306.

FIGS. 4A to 4D illustrate second exemplary scenarios associated with playout of a disparate live media output stream published in FIG. 3, in accordance with an exemplary embodiment of the disclosure. Referring to the exemplary scenario of FIGS. 4A to 4D, there are shown disparate live media output streams corresponding to disparate live media output stream manifests 402A to 402D published in a similar manner as the disparate live media output stream manifest 306 is published in FIG. 3. The playout of the disparate live media output stream manifests 402A to 402D may be performed by the media player of the client device 132a. The playout of the disparate live media output stream manifests 402A to 402D may be looped by the stream publishing engine 114 in accordance with a looped programming schedule 111 so that the channel on which the disparate live media output stream is streamed, may be kept operational for one or more weeks or months at a time if desired by the stream operator. The network scheduler 112, for looping the programming schedule 111 may be configured to identify pre-encoded media assets for which the content rights are not available in the content rights storage 148 for the entire loop duration.

Figures 4A, 4B, 4C, 4D:
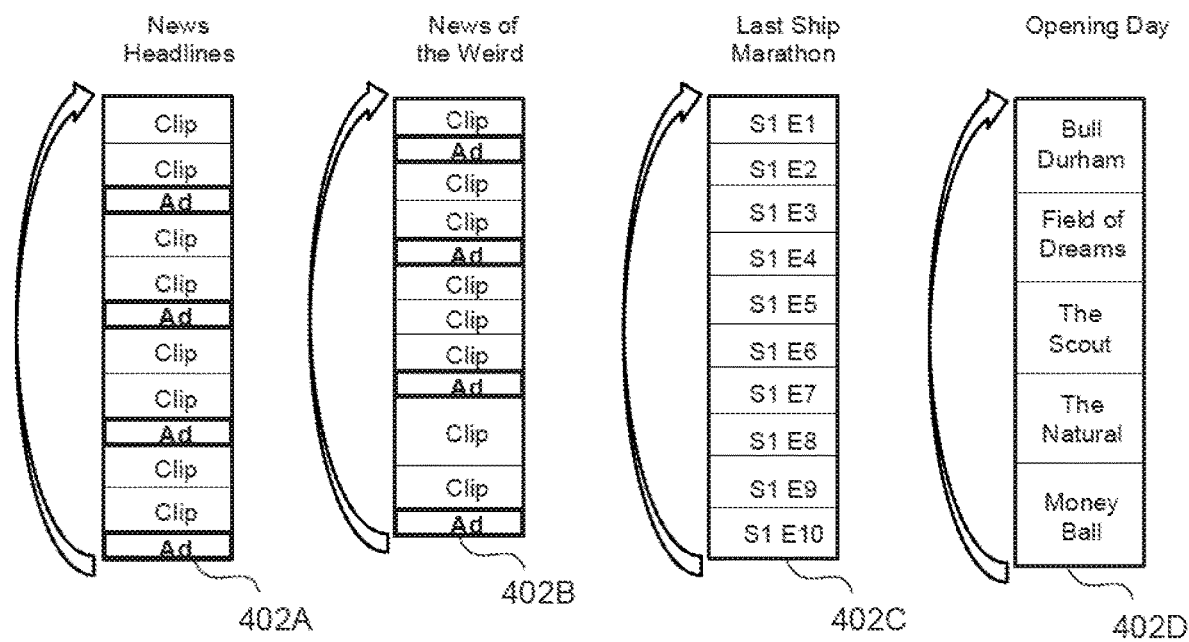
FIGS. 4A to 4D illustrate second exemplary scenarios associated with playout of disparate live media output streams, in accordance with an exemplary embodiment of the disclosure.

As illustrated in FIG. 4A, the pre-encoded media assets indicated by the disparate live media output stream manifest 402A correspond to a collection of short clips, such as latest news headlines. The network scheduler 112 may generate a looped programming schedule 111 such that the pre-encoded media segments in the disparate live media output stream manifest 402A are repeated. Further, the pre-encoded media segments in the disparate live media output stream manifest 402A may be updated by dropping some clips and adding other clips throughout the day. The disparate live media output stream manifest 402A may correspond to pre-encoded media segments associated with short clips, such as latest news headlines. One or more ad breaks may also be included in the disparate live media output stream manifest 402A.

As illustrated in FIG. 4B, the pre-encoded media assets indicated by the disparate live media output stream manifest 402A correspond to a collection of short clips, such as a collection of "weird" news stories. Similar to the programming schedule 111, the network scheduler 112 may generate a looped programming schedule 111 such that the pre-encoded media segments in the disparate live media output stream manifest 402B are repeated. Further, the pre-encoded media segments in the disparate live media output stream manifest 402B may be updated by dropping some clips and adding other clips throughout the day. The disparate live media output stream manifest 402B may correspond to pre-encoded media segments associated with short clips, such as "weird" news stories. One or more ad breaks may also be included in the disparate live media output stream manifest 402B.

As illustrated in FIG. 4C, the pre-encoded media assets indicated by the disparate live media output stream manifest 402C correspond to a sequence of episodes of a specific season of a marathon channel, such as "Last Ship". The network scheduler 112 may generate a looped programming schedule 111 such that the pre-encoded media segments, corresponding to ten episodes "E1 to E10" of "Season 1" in the disparate live media output stream manifest 402C are repeated for a fixed period of time leading up to the new season of the programming content, such as "Last Ship". One or more mid roll Ad breaks (supported via dynamic Ad insertion) may be included in the disparate live media output stream manifest 402C. Further, the slate segments may be stitched in the disparate live media output stream manifest 402C by the stream publishing engine 114 for a desired break duration. Thus, the disparate live media output stream manifest 402C is played out in a loop of all the episodes of a particular series or the previous season before the new season starts.

As illustrated in FIG. 4D, the pre-encoded media assets indicated by the disparate live media output stream manifest 402D correspond to a themed channel, such as collection of baseball movies around opening day. The network scheduler 112 may generate a looped programming schedule 111 such that the pre-encoded media segments, corresponding to five baseball movies "Bull Durham", "Field of Dreams", "The Scout", and "The Natural Money Ball", in the disparate live media output stream manifest 402D are played out for a period of time leading up to the opening day of the baseball game.

Figure 5A:
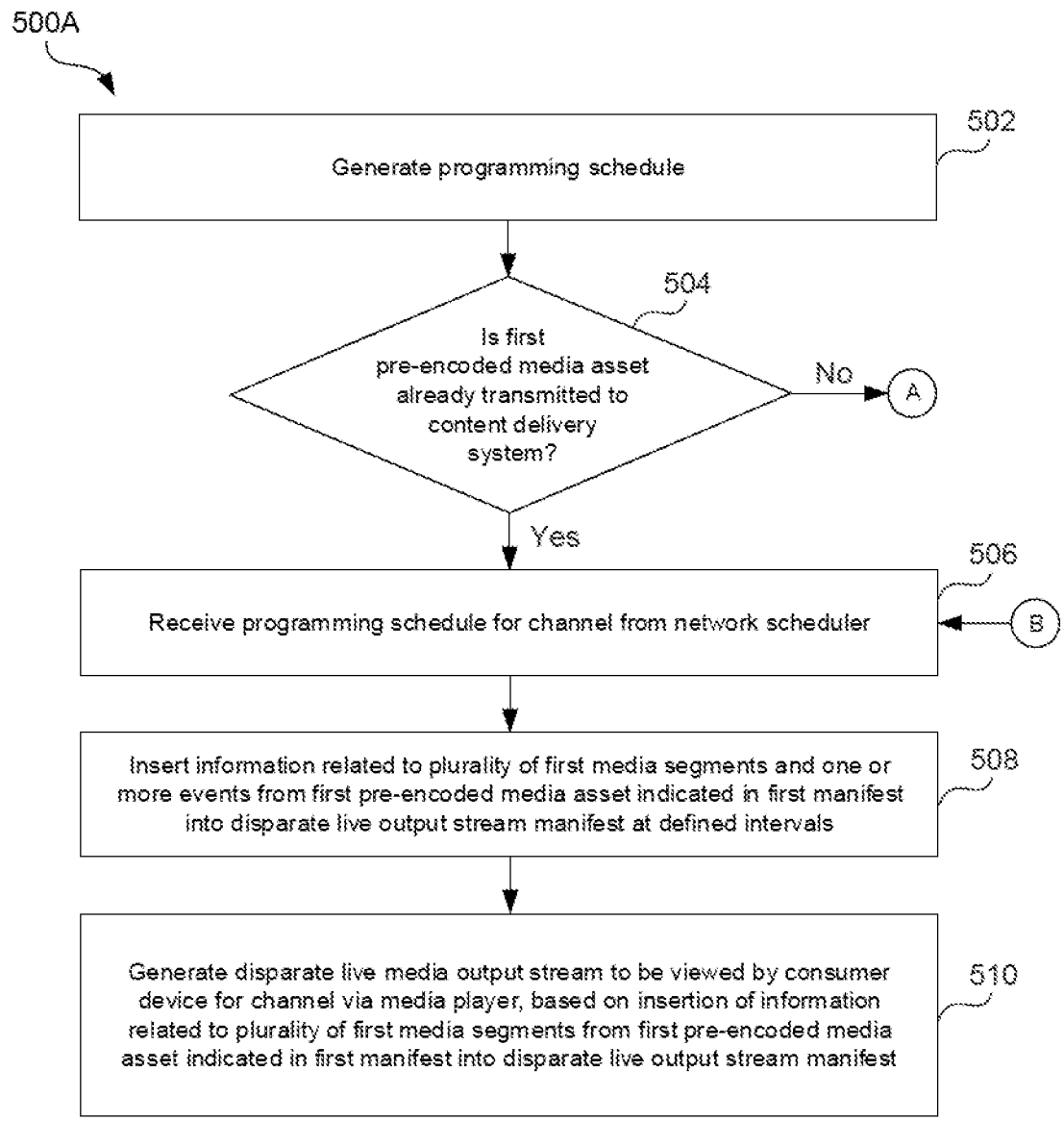
FIGS. 5A and 5B collectively depict flowcharts illustrating exemplary operations for publishing a disparate live media output stream using pre-encoded media assets in the media content packaging and distribution system of FIG. 1B, in accordance with an exemplary embodiment of the disclosure.
Figure 5B:
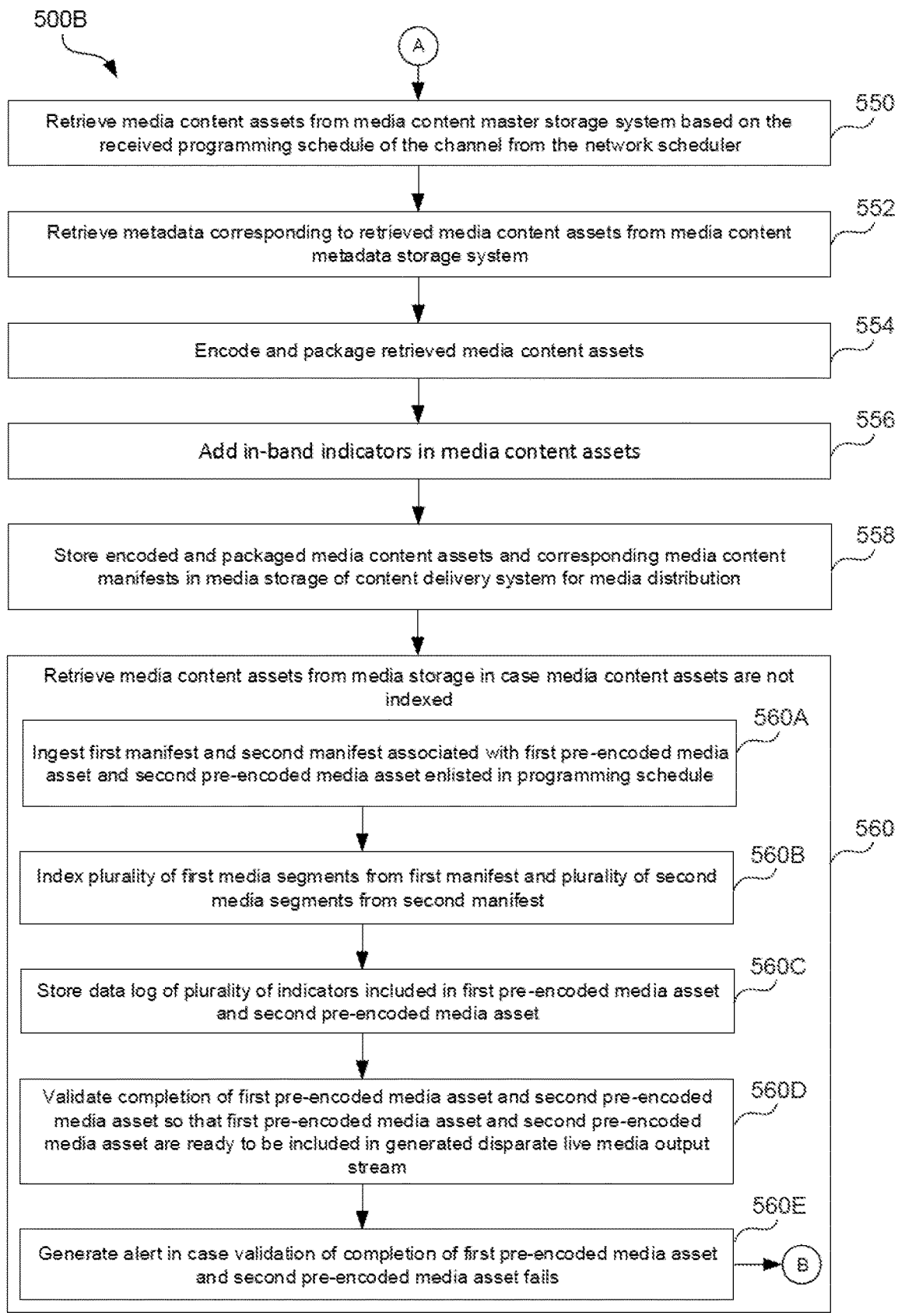

FIGS. 5A and 5B collectively depict flowcharts illustrating exemplary operations for publishing a disparate live media output stream using pre-encoded media assets in the television content packaging and distribution system of FIG. 1B, in accordance with an exemplary embodiment of the disclosure. Referring to FIGS. 5A and 5B, there are shown flowcharts 500A and 500B comprising exemplary operations 502 through 510 in flowchart 500A and 550 through 560 in flowchart 500B.

At 502, a programming schedule 111 may be generated. The programming schedule may be generated in order to provide a disparate live media output stream for a channel. In accordance with an embodiment, the network scheduler 112 may be configured to generate the programming schedule 111 comprising at least a first pre-encoded asset based on information, such as a desired channel theme, content metadata, pre-specified content rights, content availability, content eligibility, and stream operator preferences 144, retrieved from a plurality of databases.

For example, the network scheduler 112 may be configured to retrieve information, such as content rights that may allow individual client devices 132a, . . . , 132n to access the underlying On-Demand content, i.e. the pre-encoded assets, to enable services such as restarting a programming content from the beginning, moving forward in the programming schedule 111 to a different programming content, from a first database, such as the experience control system 146.

The network scheduler 112 may be further configured to retrieve information, such as a set of rules that control when and how content may be used, from a second database, such as the content rights storage 148. The set of rules may include, for example, when the programming content may be made available as pre-encoded media assets, whether the programming content may be made available over the Internet, whether the programming content may be used in a disparate live media output stream and the timeframe, whether the user, such as the user 134a, is allowed to restart the programming content when streamed as disparate live media output stream, and the like.

The network scheduler 112 may be further configured to retrieve information, such as an index of previous content selections for programing content performed by the user, such as the user 134a, for a personalized and organized user experience in subsequent time stamps, and the like, from a third database, such as the user preferences repository 150.

The network scheduler 112 may be further configured to retrieve information, such as parameters regarding types of channels to be generated (such as theme, genre, or title of the media assets), a number of non-programming content breaks per hour, a duration of one or more non-programming content breaks, insertion of the one or more non-programming content breaks within the first pre-encoded media asset and between the first pre-encoded media asset and a second pre-encoded media asset, requirement and frequency of display of a network logo, and the like, from a fourth database, such as the stream operator preferences 144.

The programming schedule 111 may correspond to manifests, such as a first and a second manifest, associated with pre-encoded media assets, such as a first pre-encoded media asset and a second pre-encoded media asset. In certain instances, the pre-encoded media assets may be available for usage, however, in other instances, the pre-encoded media assets may not be available, described in detail hereinafter.

The programming schedule 111 generated by the network scheduler 112 provides the media content packaging and distribution system 102 with the ability to present relevant eligible content for a required theme, genre, title, series, schedule duration, and the like, based on the content rights and metadata. The programming schedule 111 thus generated by the network scheduler 112 further provides the media content packaging and distribution system 102 the capability to segment content in its presentation based on whether it was already encoded and packaged for On-Demand usage or whether it was already ingested and certified through the indexing and storage system 116 and is available for immediate play out.

The programming schedule 111 thus generated by the network scheduler 112 further provides the media content packaging and distribution system 102 the capability to set ad break durations for those marked within the On-Demand content, skip ad breaks marked within the On-Demand content, schedule ad breaks including duration between On-Demand content assets, or to set rules for ad breaks for generated channels consisting of short form content, such as schedule an ad break after a defined number of short form assets or a minimum number of seconds of content, however does not insert the ad break within the content duration but immediately after it completes. Further, the capability to schedule overlay tags to be inserted into the generated disparate live media output stream, such as to insert a network logo in a disparate live media output stream that is not associated with any particular media content, and to read content metadata and schedule tags to be inserted marking credits and overlay opportunities that may not have been inserted when the pre-encoded media asset was initially packaged, are also provided.

Such generated programming schedule 111 may be configured to support simple editing of the programming schedule 111 and final approval workflow prior to publishing the programming schedule 111 and generating the channel. Further, the generated programming schedule 111 may be configured to provide support for updating and re-publishing the programming schedules 111 once the programming schedules 111 are published.

Such generated programming schedule 111 may be provided to various other systems, such as the indexing and storage system 116, the stream publishing engine 114, the stream selection service 142, and the program guide service 140.

At 504, it may be determined whether the first pre-encoded media asset is already transmitted to the content delivery system 130. In an instance, the network scheduler 112 may determine that the first pre-encoded media asset is already transmitted to the content delivery system 130 and thus, the first pre-encoded media asset is available for media distribution, in which case the control passes to 506. In such case, the first pre-encoded media asset may be used without the cost or time required for content encoding and packaging. In accordance with an embodiment, the network scheduler 112 may require the first pre-encoded media asset for nearly immediate turn around. In such an embodiment, the network scheduler 112 may communicate with the indexing and storage system 116 to determine if the first pre-encoded media asset was already processed and available for immediate output.

In another instance, the network scheduler 112 may determine that the first pre-encoded media asset is not available in the content delivery system 130 for media distribution, in which case the control passes to 550 in flowchart 500B.

Referring to flowchart 500B, at 550, media content assets may be retrieved from the media content master storage system 124 based on the received programming schedule 111 of the channel from the network scheduler 112. In accordance with an embodiment, the content encoder packager 128 may be configured to retrieve the media content assets from the media content master storage system 124 based on the received programming schedule 111 of the channel from the network scheduler 112. The media content master storage system 124 may be configured to store master versions of the media content assets which may be utilized to create pre-encoded media assets for client devices 132a, . . . , 132n in required formats. Various media container formats of the media content assets may include, but are not limited, TS, fMP4, CMAF, and the like.

At 552, metadata corresponding to the retrieved media content assets may be retrieved from the media content metadata storage system 126. In accordance with an embodiment, the content encoder packager 128 may be configured to retrieve metadata, such as duration of the media content assets, duration and location of one or more non-programming content breaks, credits, and overlay opportunities, corresponding to the retrieved media content assets from the media content metadata storage system 126. Other examples of the metadata may include, but are not limited to, title and type of media content assets, such as season episode number of a movie series, genre, plot summary, duration, ad break locations, credit locations, and scene descriptions.

At 554, the retrieved media content assets may be encoded and packaged. In accordance with an embodiment, the content encoder packager 128 may be configured to encode and package the retrieved media content assets. For encoding and the packaging, the content encoder packager 128 may be configured to mark locations of the one or more non-programming content breaks and conditioning the media assets such that the locations of the one or more non-programming content breaks are adjacent to boundaries of the plurality of first media segments. Based on the content metadata, in case the one or more indicators are not included in the first pre-encoded media asset at packaging time, the content encoder packager 128 may be configured to insert one or more indicators to mark the credits and overlay graphics locations in the media content assets. In other words, in an exemplary scenario, the media content asset may be encoded and packaged by the content encoder packager 128 for web distribution including marking the precise non-programming content break locations and conditioning the media content asset, so that such non-programming content break locations fall on boundaries of the plurality of first media segments. Also, tags may be inserted to mark the credits and the potential overlay graphics locations in the media content asset. Once the content encoder packager 128 has encoded and packaged the media content assets and retrieved the associated metadata corresponding to the media content assets for media distribution, the content encoder packager 128 may be further configured to generate corresponding media content manifests. The media content manifests may correspond to data sets, such as text-based instruction sets, that may be utilized by the client device 132a to determine which media segments to play and storage locations of such media segments. Various formats of the media content manifests or playlist, may be, but are not limited DASH and HLS.

At 556, in-band indicators may be added in the media content assets. In accordance with an embodiment, the content encoder packager 128 may be configured to add in-band indicators in the media content assets. The in-band indicators may indicate markers corresponding to location of the one or more non-programming content breaks, credits, and overlay graphic locations for one or more protocols that may be utilized to determine next media content asset to be downloaded. In other words, for example, in-band triggers may be added to mark the location of the ad breaks, credits, and potential overlay graphic locations for such protocols that do not constantly query a manifest for new information. In-band triggers may be utilized to determine the next media content asset to be downloaded based on a defined algorithm. The in-band ad indicators and graphic overlay indicators may be included in the media content assets during creation of the first pre-encoded media asset.

At 558, the encoded and packaged media content assets and associated media content manifests may be stored in the media storage 152 of the content delivery system 130 for media distribution. In accordance with an embodiment, the content encoder packager 128 may be configured to store encoded and packaged the media content assets, now referred to as first and second pre-encoded media content assets, and corresponding media content manifests in the media storage 152 of the content delivery system 130 for web distribution, for example.

At 560, media content assets from the media storage may be retrieved in case the media content assets are not indexed. In accordance with an embodiment, the indexing and storage system 116 may be configured to retrieve the manifest of the media content assets from the media storage 152 in case the media content assets are not indexed. The indexing may be performed by the indexing and storage system 116 as per the following sub-steps.

At 560A, the first manifest and the second manifest, associated with the first pre-encoded media asset and the second pre-encoded media asset enlisted in the programming schedule 111, may be ingested. In accordance with an embodiment, the indexing and storage system 116 may be configured to ingest the first manifest and the second manifest associated with the first pre-encoded media asset and the second pre-encoded media asset enlisted in the programming schedule 111. In accordance with an embodiment, a proprietary manifest format may be implemented between the content encoder packager 128 and the indexing and storage system 116 in case additional information is required to be communicated to the indexing and storage system 116, which is not traditionally communicated in a published manifest.

At 560B, a plurality of first media segments from the first manifest and a plurality of second media segments from the second manifest may be indexed. In accordance with an embodiment, the indexing and storage system 116 may be configured to index the plurality of first media segments from the first manifest and the plurality of second media segments from the second manifest. In accordance with an embodiment, the plurality of first media segments may be generated based on encoding and packaging status of media content assets, ingestion status of the first and the second pre-encoded media assets into the indexing and storage system 116, and availability of the first and the second pre-encoded media assets for immediate playout.

At 560C, a data log of a plurality of indicators included in the first pre-encoded media asset and the second pre-encoded media asset may be stored. The plurality of indicators indicates, for example, non-programming content breaks, program start, program end, and graphic overlays. In accordance with an embodiment, the indexing and storage system 116 may be configured to store the data log of the plurality of indicators indicating non-programing content breaks, program start, program end, and graphic overlays included in the first pre-encoded media asset and the second pre-encoded media asset.

At 560D, completion of the first pre-encoded media asset and the second pre-encoded media asset may be validated so that the first pre-encoded media asset and the second pre-encoded media asset are ready to be included in the generated disparate live media output stream. In accordance with an embodiment, the indexing and storage system 116 may be configured to validate the completion of the first pre-encoded media asset and the second pre-encoded media asset so that the first pre-encoded media asset and the second pre-encoded media asset may be included in the generated disparate live media output stream.

At 560E, an alert may be generated in case the validation of the completion of the first pre-encoded media asset and the second pre-encoded media asset fails. In accordance with an embodiment, the indexing and storage system 116 may be configured to generate the alert in case the validation of the completion of the first pre-encoded media asset and the second pre-encoded media asset fails. In such case, the indexing and storage system 116 may be configured to execute a corrective action before playout of the programming schedule 111.

In other words, indexing of information of the first pre-encoded media asset and the second pre-encoded media asset manifests enlisted in the programming schedule 111 include logging of all the media segments contained in the manifests (or playlists), and all the tags or other markers indicating ad breaks, overlay opportunities, credit locations, and the like in the pre-encoded media content assets. The indexing and storage system 116 verifies the pre-encoded media assets that were not previously indexed and also ensures that each media content asset is only indexed once. The indexing and storage system 116 may be further configured to identify and replace previously indexed media content assets with a newer version. The indexing and storage system 116 may support multiple manifest formats, that may include, but are not limited HLS, DASH, and potentially a proprietary format in case information, not contained in a public format, is required to be communicated. Control returns to 506 in flowchart 500A.

At 506, the programming schedule 111 for the channel from the network scheduler 112 may be received. In accordance with an embodiment, the stream publishing engine 114 may be configured to receive the programming schedule 111 for the channel from the network scheduler 112. In accordance with another embodiment, the stream selection service 142 may be configured to access the program guide service 140 service to present a list of available disparate live media output streams and programing content published for each disparate live media output stream. Based on the selection provided by user associated with the client device, such as the client device 132a, the programming schedule 111 may be altered and provided to the stream publishing engine 114.

At 508, information related to the plurality of first media segments and one or more events from the first pre-encoded media asset indicated in the first manifest may be inserted into a disparate live media output stream manifest at defined intervals. In accordance with an embodiment, the stream publishing engine 114 may be configured to insert information related to the plurality of first media segments and one or more events from the first pre-encoded media asset indicated in the first manifest into the disparate live media output stream manifest at defined intervals. The defined intervals may be intervals at which the insertion of the information related to the plurality of first media segments and the one or more events from the first pre-encoded media asset indicated in the first manifest into the disparate live media output stream manifest is performed, is not greater than a duration of a previous media content segment.

In other words, at the schedule time, the stream publishing engine 114 may be configured to generate the disparate live media output stream manifest by inserting a new media segment from the scheduled pre-encoded media asset into the disparate live media output stream manifest on an interval not greater than the previous content segment duration. For certain protocols, the insertion may only be required at media content breaks for ads or transitions to the next pre-encoded media asset. In certain implementations of the DASH protocol, an algorithm or a convention, known to the media player may be used to identify the individual media segments. In this way, the media player may determine the next media segment to acquire without first having to acquire an updated manifest. In the case in-band triggers may be needed to mark change locations, the media player may be informed to acquire a new manifest instead of assuming the next media segment based on the algorithm or the convention.

In accordance with an embodiment, the stream publishing engine 114 may be further configured to insert one or more overlay indicators, which are independent of the first pre-encoded media asset, at defined time stamps in the generated disparate live media output stream based on the received programming schedule 111. In accordance with another embodiment, the stream publishing engine 114 may be further configured to support a plurality of digital rights management indicators in the first manifest. In accordance with another embodiment, the stream publishing engine 114 may be further configured to include one or more of a program start, a program end, content or context change indicator, a break indicator, an overlay indicator in the generated disparate live media output stream based on one or more events in the first manifest, the received programming schedule 111, or metadata associated with the first pre-encoded media asset.

In one embodiment, when an event of the one or more events corresponds to an indicator marking a first non-programming content break within the first manifest or an end of the first manifest, the stream publishing engine 114 may be configured to insert the first non-programming content break corresponding to the indicator in the disparate live media output stream manifest. The stream publishing engine 114 may be configured to access the media content metadata storage system 126 to determine new indicator locations that are not included in the first manifest. In other words, the stream publishing engine 114 may communicate directly with the media content metadata storage system 126 to determine new tag locations that may not have been included in the first and/or the second manifests.

Accordingly, the stream publishing engine 114 may be configured to stitch a pre-encoded place holder content segment for the scheduled duration of the first non-programming content break as defined by the received programming schedule 111. In other words, when the stream publishing engine 114 comes across tags marking an ad break within the first and/or the second manifests, the stream publishing engine 114 may insert an ad break tag in the disparate live media output stream manifest and stitch in the first and/or the second pre-encoded slate content segments for the scheduled duration of the ad break as defined by the programming schedule 111.

In accordance with another embodiment, when an event of the one or more events corresponds to at least a credit or an overlay indicator, within the first manifest, the stream publishing engine 114 may be configured to insert the credit or the overlay indicators in the disparate live media output stream manifest as defined by the received programming schedule 111. In other words, when the stream publishing engine 114 comes across credit or overlay tags, in the scheduled first and/or the second manifests, the stream publishing engine 114 may insert such indicators into the generated first and/or the second manifest as defined by the programming schedule 111. Alternatively or additionally, the stream publishing engine 114 may be configured to receive instructions from the programming schedule 111 to insert certain overlay tags at certain times in the generated disparate live media output stream in case such indicators are not specific to the first and/or the second pre-encoded media asset, such as a network logo.

In accordance with yet another embodiment, for the first non-programming content break inserted within the first pre-encoded media asset, the stream publishing engine 114 may be further configured to resume the first pre-encoded media asset after duration of the first non-programming content break as defined by the received programming schedule 111. In other words, when the stream publishing engine 114 comes to the end the first manifest, the stream publishing engine 114 may insert ad break tags in the disparate live media output stream manifest and stitch in pre-encoded slate content segments for the scheduled duration of the ad break as defined by the programming schedule 111. For ad breaks marked within the first or the second pre-encoded media asset, the stream publishing engine 114 may resume the first and/or the second pre-encoded media asset after the defined break duration, as defined by the programming schedule 111.

In accordance with yet another embodiment, for the first non-programming content break inserted between the first pre-encoded media asset and the second pre-encoded media asset, the stream publishing engine 114 may be configured to move to a next pre-encoded media asset index in the received programming schedule 111 after the duration of the first non-programming content break. In such an embodiment, the stream publishing engine 114 may be configured to select the second pre-encoded media asset to generate the disparate live media output stream based on the received programming schedule 111, the second pre-encoded media asset being associated with the second manifest is previously indexed media asset, for example. The stream publishing engine 114 may be further configured to insert information related to the plurality of second media segments, one or more events, and additional information from the second pre-encoded media asset indicated in the second manifest into the disparate live media output stream manifest at defined intervals. The media player transitions between one of the plurality of first media segments and one of the plurality of second media segments based on the additional information. The additional information may be a discontinuity indicator, which may signal a media discontinuity and content protection change.

At 510, a disparate live media output stream, to be viewed by the client device, such as the client device 132a, for the channel via the media player, may be generated based on the insertion of the information related to the plurality of first and/or second media segments from the first and/or the second pre-encoded media assets indicated in the first and/or the second manifests into the disparate live media output stream manifest. In accordance with an embodiment, the stream publishing engine 114 may be further configured to generate the disparate live media output stream. The disparate live media output stream manifest may correspond to a data set that includes playlists of a plurality of pre-encoded media assets, information about the plurality of pre-encoded media assets, one or more overlay opportunities, and duration of a set of non-programing content breaks within one on-demand media asset or between at least two of the plurality of pre-encoded media assets. The generated disparate live media output stream is in a state eligible for media distribution on the one or more of the plurality of client devices, such as the client devices 132a, . . . , 132n, via the content delivery system 130. The generated disparate live media output stream is independent of a requirement to re-encode and re-package first pre-encoded media asset for media distribution of the generated disparate live media output stream to the plurality of client devices 132a, . . . , 132n.

In accordance with an embodiment, the media content packaging and distribution system 102 may be configured to provide real time data for each active generated disparate live media output stream to the program guide service 140 for correction in timing discrepancies between the received programming schedule and current playout of pre-encoded media assets by a media player of the client device 132a at a specific time. In such a case, the media content packaging and distribution system 102 may be configured to send a program update to the program guide service 140 for each transition point in the programming schedule. The transition point may correspond to an ending of a programing content, a beginning of a new programing content, or an insertion of a non-programming content. The program guide service 140 may be accessed by the client device 132a to determine a plurality of channels are available at a specific time and media content playing out on each channel.

Figure 6:
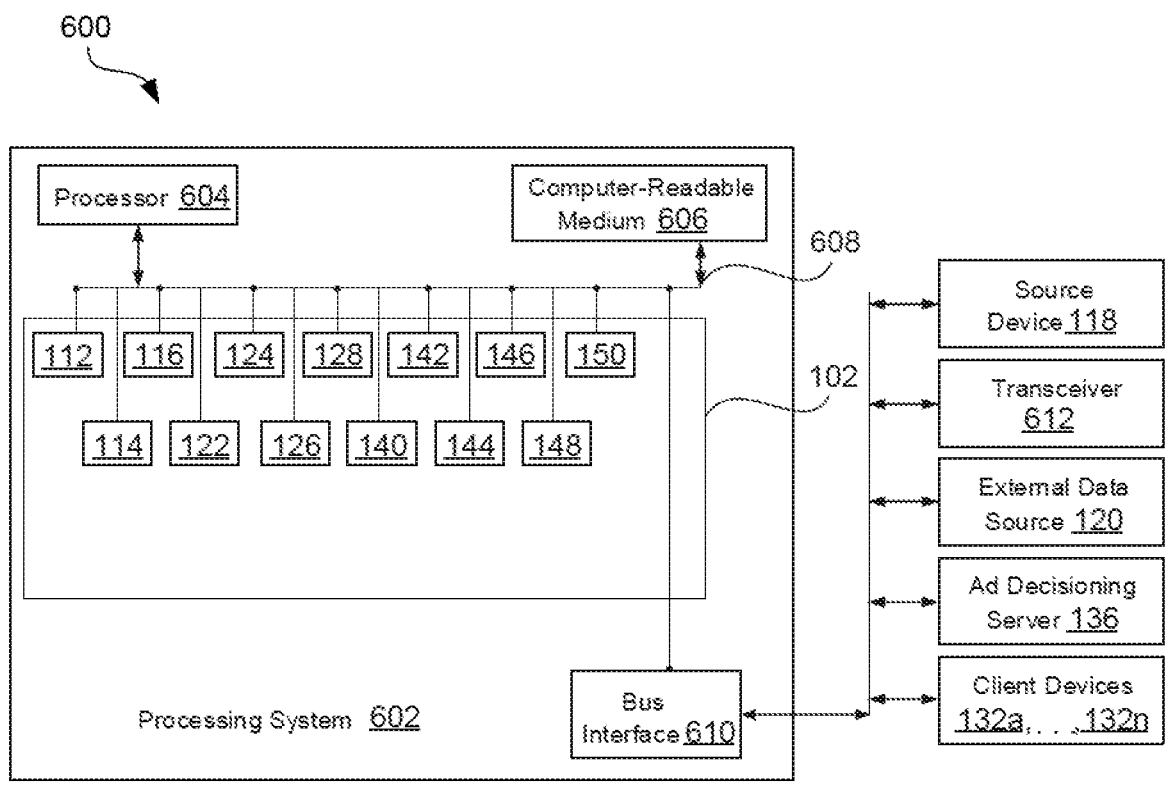
FIG. 6 is a conceptual diagram illustrating an example of a hardware implementation for a media content packaging and distribution system employing a processing system for publishing a disparate live media output stream using pre-encoded media assets, in accordance with an exemplary embodiment of the disclosure.

FIG. 6 is a conceptual diagram illustrating an example of a hardware implementation for a content packaging and distribution system employing a processing system for publishing a disparate live media output stream using pre-encoded media assets, in accordance with an exemplary embodiment of the disclosure. Referring to FIG. 6, the hardware implementation shown by a representation 600 for the media content packaging and distribution system 102 employs a processing system 602 for publishing a disparate live media output stream using pre-encoded media assets, in accordance with an exemplary embodiment of the disclosure, as described herein.

In some examples, the processing system 602 may comprise one or more hardware processor 604, a non-transitory computer-readable medium 606, a bus 608, a bus interface 610, and a transceiver 612. FIG. 6 further illustrates the network scheduler 112, the stream publishing engine 114, the indexing and storage system 116, an application server 122, the media content master storage system 124, the media content metadata storage system 126, and the content encoder packager 128. The processing system 602 may further comprise the program guide service 140, the stream selection service 142, the stream operator preferences 144, the experience control system 146, the content rights storage 148, and the user preferences repository 150, as described in detail in FIGS. 1A and 1B.

The hardware processor 604 may be configured to manage the bus 608 and general processing, including the execution of a set of instructions stored on the computer-readable medium 606. The set of instructions, when executed by the processor 604, causes the media content packaging and distribution system 102 to execute the various functions described herein for any particular apparatus. The hardware processor 604 may be implemented, based on a number of processor technologies known in the art. Examples of the hardware processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the processor 604 when executing the set of instructions. The data is stored for short periods or in the presence of power. The computer-readable medium 606 may also be configured to store data for one or more of the network scheduler 112, the hardware stream publishing engine 114, the indexing and storage system 116, the application server 122, the media content master storage system 124, the media content metadata storage system 126, the content encoder packager 128, the program guide service 140, the stream selection service 142, the stream operator preferences 144, the experience control system 146, the content rights storage 148, and the user preferences repository 150.

The bus 608 is configured to link together various circuits. In this example, the media content packaging and distribution system 102 employing the processing system 602 and the non-transitory computer-readable medium 606 may be implemented with bus architecture, represented generally by bus 608. The bus 608 may include any number of interconnecting buses and bridges depending on the specific implementation of the media content packaging and distribution system 102 and the overall design constraints. The bus interface 610 may be configured to provide an interface between the bus 608 and other circuits, such as, the transceiver 612, and external devices, such as the source device 118, the external data source 1220, the Ad decisioning server 136, and the client devices 132a, . . . , 132n.

The transceiver 612 may be configured to provide a communication of the media content packaging and distribution system 102 with various other apparatus, such as the Ad decisioning servers 106a, . . . , 106n, the consumer devices 110a, . . . , 110n, such as the client devices 132a, . . . , 132n, the external data source 120, and the source device 118, via the network 108. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 6 may include software whose corresponding code may be executed by at least one processor, for across multiple processing environments. For example, the network scheduler 112, the indexing and storage system 116, the application server 122, the media content master storage system 124, the media content metadata storage system 126, the content encoder packager 128, the program guide service 140, the stream selection service 142, the stream operator preferences 144, the experience control system 146, the content rights storage 148, and the user preferences repository 150 may include software that may be executed across a single or multiple processing environments.

In an aspect of the disclosure, the processor 604, the computer-readable medium 606, or a combination of both may be configured or otherwise specially programmed to execute the operations or functionality of the network scheduler 112, the hardware stream publishing engine 114, the indexing and storage system 116, the application server 122, the media content master storage system 124, the media content metadata storage system 126, the content encoder packager 128, the program guide service 140, the stream selection service 142, the stream operator preferences 144, the experience control system 146, the content rights storage 148, and the user preferences repository 150, or various other components described herein, as described with respect to FIGS. 1A to 5B.

Various embodiments of the disclosure comprise a media content packaging and distribution system 102 that may be configured to generate a plurality of disparate live media output streams to be viewed on a plurality of consumer devices (such as the consumer devices 110a, ..., 110n). The media content packaging and distribution system 102 may comprise, for example, the stream publishing engine 114, the indexing and storage system 116, the application server 122, the media content master storage system 124, the media content metadata storage system 126, the content encoder packager 128, the program guide service 140, the stream selection service 142, the stream operator preferences 144, the experience control system 146, the content rights storage 148, and the user preferences repository 150. The network scheduler 112 may be configured to generate a programming schedule, such as the programming schedule 111, for a consumer device (such as the consumer devices 110a). The programming schedule 111 corresponds to at least a first manifest associated with a first pre-encoded media asset. The stream publishing engine 114 may receive the programming schedule 111 for a channel from the network scheduler 112. The stream publishing engine 114 may insert information related to a plurality of first media segments and one or more events from the first pre-encoded media asset indicated in the first manifest into a live output stream manifest at defined intervals. The stream publishing engine 114 may generate a disparate live media output stream, to be viewed by the consumer device 110a for a channel via a media player, based on the insertion of the information related to the plurality of first media segments from the first pre-encoded media asset indicated in the first manifest into the live output stream manifest.

In accordance with various embodiments of the disclosure, the media content packaging and distribution system 102 is provided that generates a plurality of disparate live media output streams to be viewed on the plurality of consumer devices 110a, 110n. The stream publishing engine 114 in the media content packaging and distribution system 102 receives the programming schedule 111 for a channel from the network scheduler 112. The programming schedule 111 corresponds to at least a first manifest associated with a first pre-encoded media asset. Information related to a plurality of first media segments and one or more events from the first pre-encoded media asset indicated in the first manifest may be inserted into a live output stream manifest at defined intervals. The defined intervals, at which the insertion of the information related to the plurality of first media segments and the one or more events from the first pre-encoded media asset indicated in the first manifest into the live output stream manifest may be performed, is not greater than a duration of a previous media content segment. The stream publishing engine 114 may generate the disparate live media output stream, to be viewed by the consumer device 110a for a channel via a media player, based on the insertion of the information related to the plurality of first media segments from the first pre-encoded media asset indicated in the first manifest into the live output stream manifest. The first manifest may correspond to a first data set that includes playlists of reference addresses of the first pre-encoded media asset, information about the first pre-encoded media asset, one or more overlay opportunities, and duration of a first set of non-programing content breaks corresponding to midroll insertion points within one pre-encoded media asset or non-programing content breaks between the first pre-encoded media asset. The disparate live media output stream manifest may correspond to a data set that includes playlists of a plurality of pre-encoded media assets, information about the plurality of pre-encoded media assets, one or more overlay opportunities, and duration of a set of non-programing content breaks within an on-demand media asset or between at least two of the plurality of pre-encoded media assets.

The generated disparate live media output stream is in a state eligible for media distribution on the one or more of the plurality of consumer devices 110a, ..., 110n via the content delivery system 130. The generated disparate live media output stream is independent of a requirement to re-encode and re-package first pre-encoded media asset for media distribution of the generated disparate live media output stream to the plurality of consumer devices 110a, ..., 110n.

In accordance with an embodiment, the network scheduler 112 may generate the programming schedule 111 for the generation of the disparate live media output stream for the channel based on a desired channel theme, content metadata, pre-specified content rights, content availability, content eligibility, and stream operator preferences 144. The stream operator preferences 144 may comprise parameters related to types of channels to be generated, a number of non-programming content breaks per hour, a duration of one or more non-programming content breaks, insertion of the one or more non-programming content breaks within the first pre-encoded media asset and between the first pre-encoded media asset and a second pre-encoded media asset, requirement and frequency of display of a network logo. The types of channels may be determined based on, for example, a theme, a genre, a title of the media assets, and/or other identifier of the media assets.

In accordance with an embodiment, a media content packaging and distribution system 102 may determine whether the first pre-encoded media asset may be transmitted to the content delivery system 130 in case the first pre-encoded media asset may be available for media distribution. The indexing and storage system 116 may be accessed to retrieve the first pre-encoded media asset in case the first pre-encoded media asset is not indexed. Alternatively, in case the first pre-encoded media asset is not available for media distribution, the indexing and storage system 116 may retrieve media content assets from the media content master storage system 124. The retrieval may be based on the received programming schedule 111 of the channel from the network scheduler 112, duration of the media content assets, duration and location of one or more non-programming content breaks, credits, and overlay opportunities corresponding to the retrieved media content assets from the media content metadata storage system 126. The indexing and storage system 116 may encode and package the retrieved media content assets. The encoding and the packaging may comprise marking locations of the one or more non-programming content breaks, conditioning the media assets such that the locations of the one or more non-programming content breaks are adjacent to boundaries of the plurality of first media segments, and inserting one or more indicators to mark the credits and overlay graphics locations in the media content assets based on content metadata in case the one or more indicators are not included in the first pre-encoded media asset at packaging time. The indexing and storage system 116 then stores the encoded and packaged media content assets and associated media content manifest in the media storage 152 of the content delivery system 130 for media distribution.

In accordance with an embodiment, the indexing and storage system 116 may index the plurality of first media segments from the first manifest and a plurality of second media segments from the second manifest. For indexing, the indexing and storage system 116 ingests the first manifest and the second manifest associated with the first pre-encoded media asset and the second pre-encoded media asset listed in the programming schedule 111. The indexing and storage system 116 further stores data log of a plurality of indicators indicating non-programing content breaks, program start, program end, and graphic overlays included in the first pre-encoded media asset and the second pre-encoded media asset. The indexing and storage system 116 may validate the completion of the first pre-encoded media asset and the second pre-encoded media asset, so that the first pre-encoded media asset and the second pre-encoded media asset are available and ready to be included in the generated disparate live media output stream.

In accordance with an embodiment, the network scheduler 112 may add in-band indicators in the media content assets. The in-band indicators indicate markers, which may correspond to locations of the one or more non-programming content breaks, credits, and overlay graphic locations for one or more protocols that may be utilized to determine the next media content asset to be downloaded.

In accordance with an embodiment, the consumer devices 110a, . . . , 110n may generate a request to the non-programming content proxy server 138 for retrieval of non-programming content. The request may be generated when a break indicator and/or pre-encoded place holder content segment for a scheduled duration of one or more non-programming content breaks, as defined by the received programming schedule 111, may be encountered in the disparate live media output stream manifest during media content playout by the media player at the consumer device 110a.

In accordance with an embodiment, when an event of the one or more events corresponds to an indicator marking a first non-programming content break within the first manifest or an end of the first manifest, the stream publishing engine 114 may insert the first non-programming content break corresponding to the indicator in the disparate live media output stream manifest. The stream publishing engine 114 may further stitch a pre-encoded place holder content segment for a scheduled duration of the first non-programming content break as defined by the received programming schedule 111. Further, when an event of the one or more events corresponds to at least a credit or an overlay indicator, within the first manifest, the stream publishing engine 114 may insert the credit or the overlay indicators in the disparate live media output stream manifest as defined by the received programming schedule 111.

In accordance with an embodiment, for the first non-programming content break inserted within the first pre-encoded media asset, the first pre-encoded media asset may be resumed after a duration of the first non-programming content break as defined by the received programming schedule 111. For the first non-programming content break inserted between the first pre-encoded media asset and a second pre-encoded media asset, the network scheduler 112 is further configured to move to a next pre-encoded media asset index in the received programming schedule 111 after the duration of the first non-programming content break.

In accordance with an embodiment, the network scheduler 112 may select second pre-encoded media asset to generate the disparate live media output stream based on the received programming schedule 111. The second pre-encoded media asset associated with a second manifest may be a previously indexed media asset. The stream publishing engine 114 may insert information related to a plurality of second media segments, one or more events, and additional information from the second pre-encoded media asset indicated in the second manifest, into the live output stream manifest at defined intervals. The media player may transition between one of the plurality of first media segments and one of the plurality of second media segments based on the additional information. The additional information may be a discontinuity indicator, which may signal a media discontinuity and content protection change.

In accordance with an embodiment, the network scheduler 112 may access the media content metadata storage system 126 to determine new indicator locations that are not included in the first manifest. The one or more overlay indicators, which are independent of the first pre-encoded media asset, may be inserted at defined time stamps in the generated disparate live media output stream based on the received programming schedule 111.

In accordance with an embodiment, a program update may be sent to a program guide service for each transition point in the programming schedule 111. The transition point may correspond to an ending of a programing content, a beginning of a new programing content, or an insertion of a non-programming content.

In accordance with an embodiment, the media packaging and distribution system 102 may present a list of disparate live media output streams, or recommend one of the list of disparate live media output streams associated with the generated disparate live media output stream to the consumer device 110a. The presentation and the recommendation may be based on, for example, based on a combination of one or more programing schedules, genre, demographics, geolocation of the consumer device 110a, type or category of consumer device 110a, a time of viewing, individual user preferences based on previous selections and association of a plurality of disparate live media output streams with corresponding broadcast channels or brand portals.

In accordance with an embodiment, the consumer device 110a to may be enabled to personalize corresponding viewing preference of the generated disparate live media output stream based on various factors. Such factors may include the first pre-encoded media asset, link to the first pre-encoded media asset upon joining the generated disparate live media output stream with a programming content in progress and an intent to start the programming content from the beginning based on verified media content rights. Such factors may further include view of a playlist or a plurality of disparate live media output streams containing next episodes of the programming content to play upon completion of an episode selected for programming content restart, move forward in time in the program guide service 140, based on pre-specified content rights and business rules of a stream operator. Such factors may further include playout of an upcoming program via a link to the first pre-encoded media asset, view a playlist or the plurality of disparate live media output streams containing the next episodes to play after the episode selected to jump ahead to view, and download, based on verified media content rights, the first pre-encoded media asset for offline consumption in case the user 134a, for example, is still viewing the media content in the generated disparate live media output stream.

In accordance with an embodiment, the stream selection service 142 may access the program guide service 140 to present a list of available disparate live media output streams and programing content published for each disparate live media output stream. The program guide service 140 may be accessed by the consumer device 110a to determine a plurality of channels that are available at a specific time and media content playing out on each channel of the plurality of available channels.

In accordance with an embodiment, a plurality of profiles presented in the first pre-encoded media asset may be supported into the generated disparate live media output stream. The plurality of profiles may include information that specifies, at least, one or more resolutions, and/or one or more bitrates.

In accordance with an embodiment, the generated disparate live media output stream may be recommended for viewing based on one or more of genre information, demographic information related to the programming schedule 111, geolocation of the plurality of consumer devices 110a, . . . , 110n, and individual user preferences. One or more of a program start, a program end, a content or context change indicator, a break indicator, an overlay indicator based on one or more events in the first manifest, the received programming schedule 111, or metadata associated with the first pre-encoded media asset may be included in the generated disparate live media output manifest. In-band ad indicators and graphic overlay indicators, corresponding the one or more events, may also be included in the first pre-encoded media asset during creation of the first pre-encoded media asset.

In various embodiments, a plurality of digital rights management indicators may be supported in the first manifest, accurate program timing may be maintained for the generated disparate live media output stream, and real time data may be provided for each active generated disparate live media output stream to the program guide service 140 for correction in timing discrepancies between the received programming schedule 111 and current playout of pre-encoded media assets by a media player at a specific time.

In accordance with an embodiment, one or more of indexing information listed in the first manifest for the first pre-encoded media asset listed in the programming schedule 111, logging the plurality of first segments and the one or more events included in the first pre-encoded media asset, verifying a non-indexed first pre-encoded media asset, and replacing previously indexed first pre-encoded media asset with a newer version may be performed. Further, the plurality of first media segments may be generated based on an encoding and packaging status of a first media content asset, ingestion status of the first pre-encoded media asset into the indexing and storage system 116, and availability of the first pre-encoded media asset for immediate playout. Furthermore, one or more of a setting duration, a skipping content, scheduling publishing, or a determining of rules for one or more non-programming content breaks marked within the first pre-encoded media asset may be performed.

In accordance with an embodiment, the programming schedule 111 may be looped based on stream operator preferences 144. Each asset in the programming schedule 111 confirming to pre-defined content rights of the looped program schedule may be verified. The generated disparate live media output stream for the channel may provide a plurality of viewing options to the user 134a associated with the consumer device 110a. The plurality of viewing options may correspond to a genre-based channel, a marathon or binge channel, or a themed channel.

Various embodiments of the disclosure may provide a non-transitory computer-readable medium, such as the non-transitory computer-readable medium 606, having stored thereon, computer implemented instruction that when executed by a processor causes the media content packaging and distribution system 102 to execute operations to generate a plurality of disparate live media output streams to be viewed on a plurality of consumer devices (such as the consumer devices 110a, . . . , 110n). The media content packaging and distribution system 102 may execute operations comprising receiving a programming schedule 111 for a channel from the network scheduler 112, and inserting information related to a plurality of first media segments and one or more events from the first pre-encoded media asset indicated in the first manifest into a live output stream manifest at defined intervals. The media content packaging and distribution system 102 may further execute operations comprising generating a disparate live media output stream to be viewed by a consumer device for a channel via a media player, based on the insertion of the information related to the plurality of first media segments from the first pre-encoded media asset indicated in the first manifest into the live output stream manifest.

The network scheduler 112, the stream publishing engine 114, the indexing and storage system 116, the application server 122, the media content master storage system 124, the media content metadata storage system 126, the content encoder packager 128, the program guide service 140, the stream selection service 142, the stream operator preferences 144, the experience control system 146, the content rights storage 148, and the user preferences repository 150, in conjunction with each other, provide significant productivity and efficiency improvements since the process of generating disparate live media output streams for numerous consumer devices has been simplified as the generated disparate live media output streams are independent of a requirement to re-encode and re-package first pre-encoded media asset for media distribution to the plurality of consumer devices in real time or near-real time. Thus, the network provider now can have the capability to not only provide live channel offerings in cost-effective manner but also provide enhanced viewer experience to increase their appeal in order to gain wider audience.

Various components, as described above in FIG. 1B, provides the media content packaging and distribution system 102 with the capability to dynamically schedule a media item, such as a pre-encoded media asset, and manipulate the manifests for generating disparate live media output streams for a channel to be directly delivered over the network 108 to be viewed on one or more consumer devices 110a, . . . , 110n. A plurality of disparate live media output streams may be created utilizing less memory than would otherwise be required resulting in much faster processing time (faster computation time without sacrificing accuracy). This enables a faster or real time change of programming schedule 111 and scheduling of selected pre-encoded assets. The ability to quickly generate disparate live media output streams may free up valuable processing resources such as memory and computing power.

Such disparate live media output streams may be generated with very low investment and provide consumers more choice without having to search through a large catalog of the pre-encoded media assets. A sense of easy availability and immediacy provided by live viewing may be created. The perceived time commitment associated with selecting pre-encoded media assets and enables the user to fill time may be overcome. Further, discovery and sampling of new media content is also simplified when there is limited time to select and watch an entire program On-Demand. The present disclosure has also made it easy to "tune-in" to watch favorite parts of a programming content, and also provides an ad supported sampling of media content in the disparate live media output stream for a subscription Over the Top service offering. The generated disparate live media output stream for the channel provides a plurality of viewing options to a consumer associated with the client device, such as the consumer device 110a. The plurality of viewing options corresponds to a genre-based channel (such as 80's movies, film noir, romantic comedies, mysteries), a demographic channel (such as toddlers, young girls, teen boys, young adults), a marathon or binge channel (such as running a loop of all the episodes of a particular series or the previous season before the new season starts), a themed channel (such as collection of baseball movies around opening day, collection of holiday episodes of genre-based programing around that holiday) or a collection of short clips (such as collection of "weird" news stories, financial news, latest news headlines, user generated content, comedy shorts).

Further, the ability of the media content packaging and distribution system 102 to log user selection in an individual user preferences database to be used in an automated decision process to select the most appropriate content from that brand on a going forward basis makes the media content packaging and distribution system 102 more user friendly. Furthermore, the ability of the media content packaging and distribution system 102 to determine which generated disparate live media output stream or traditional live stream individual client devices should join, or providing a filtered list of generated live stream options, provides an enhanced user experience.

Thus, such disparate live media output streams are generated with very low investment and provide consumers more choice without having to search through a large catalog of On-Demand content. The disparate live media output streams generated based on pre-encoded media assets create a sense of easy availability and immediacy to the users. The media content packaging and distribution system 102 also overcomes the perceived time commitment associated with selecting an On-Demand asset and enables the viewer to fill time. Further, the media content packaging and distribution system 102 makes it easy to discover and sample new content when there is not time to select and watch an entire program On-Demand. Furthermore, the media content packaging and distribution system 102 makes it easy to "tune-in" to watch favorite parts of a programming content that are not seen recently. Besides, the media content packaging and distribution system 102 also provides an ad supported sampling of media content in disparate live media output streams in front of a subscription OTT service offering.

Therefore, given the trends toward content distribution using Internet Protocols, there is a provided the media content packaging and distribution system 102 and method that eliminates the high cost of broadcast infrastructure to deliver live channels consisting of pre-recorded content using the modern web streaming protocols. The media content packaging and distribution system 102 and method generates a live channel using the existing pre-encoded media contents assets prepared for web distribution, based on simply manipulating the text-based on pre-encoded media content manifests to generate disparate live media output stream manifests that are delivered to a standard player. Because the media content itself does not need to be processed beyond the initial creation of the VOD assets prepared for web distribution, it is extremely inexpensive to provide such new generated live channels. The generation of live channels is based solely on the cost to manipulate the text-based manifests, which provide information for the media players in the client devices to execute. The media content packaging and distribution system 102 and method also supports targeted ad insertion on a per client basis through the insertion of tags in the disparate live media output stream manifests and further leverage the processing power of the individual client devices to insert targeted channel graphics and overlay advertisements and promotions.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing a disparate live media output stream using pre-encoded media assets.

The present disclosure may also be embodied in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   memory for storing instructions and
   one or more processors configured to execute the instructions, wherein based on the executed instructions, the one or more processors are further configured to:
   insert, into a live output stream manifest comprising information related to a plurality of media segments from a first pre-encoded media asset indicated in a first manifest, additional information from a second pre-encoded media asset indicated in a second manifest;
   determine a transition point between one or more first media segments of the plurality of media segments that are from a first data source and one or more second media segments of the plurality of media segments that are from a second data source different from the first data source, wherein the transition point is based on the additional information; and
   generate a disparate live media output stream based on (i) the transition point between the one or more first media segments and the one or more second media segments and (ii) an insertion of the information related to the plurality of media segments from the first pre-encoded media asset indicated in the first manifest into the live output stream manifest at one or more defined intervals,
   wherein a defined interval from the one or more defined intervals, for the insertion of the information related to the plurality of media segments from the first pre-encoded media asset indicated in the first manifest into the live output stream manifest, is less than a duration of a previous media segment.

2. The system according to claim 1, wherein the first pre-encoded media asset and the second pre-encoded media asset are listed in a programming schedule, and wherein the programming schedule is generated by a network scheduler based on at least one of a desired channel theme, content metadata, pre-specified content rights, content availability, content eligibility, or stream operator preferences.

3. The system according to claim 2, wherein the stream operator preferences comprise parameters related to at least one of a type of channel to be generated, a number of non-programming content breaks per hour, a duration of a non-programming content break, insertion of the non-programming content break within the first pre-encoded media asset and between the first pre-encoded media asset and the second pre-encoded media asset, or requirement and frequency of display of a network logo, and
wherein a type of channel is determined based on at least one of a theme, a genre, or a title of a media asset.

4. The system according to claim 1, wherein the one or more processors are further configured to determine the first pre-encoded media asset transmitted to a content delivery system based on availability of the first pre-encoded media asset for media distribution.

5. The system according to claim 1, wherein the one or more processors are further configured to access an indexing and storage system to retrieve the first pre-encoded media asset based on an index of the first pre-encoded media asset.

6. The system according to claim 4, wherein, based on a lack of availability of the first pre-encoded media asset for the media distribution, the one or more processors are further configured to:
retrieve media content assets from a media content master storage system based on a programming schedule of a channel from a network scheduler;
retrieve at least one of duration of the media content assets, duration and location of a non-programming content break, credits, or overlay opportunities corresponding to the media content assets from a content metadata storage system;
encode and package the retrieved media content assets, wherein the encoded and packaged media content assets comprise:
a location of the non-programming content break;
media assets conditioned such that the location of the non-programming content break is adjacent to boundaries of the plurality of media segments; and
an indicator to mark the credits and an overlay graphic location in the media content assets based on content metadata, in case of non-inclusion of the indicator in the first pre-encoded media asset at packaging time.

7. The system according to claim 6, wherein the one or more processors are further configured to add an in-band indicator in the media content assets, and
wherein the in-band indicator indicates marker corresponding to the location of the non-programming content break, the credits, and the overlay graphic location for a protocol that is utilized to determine next media content asset to be downloaded.

8. The system according to claim 6, wherein the one or more processors are further configured to store the encoded and packaged media content assets and associated media content manifest in media storage of the content delivery system for the media distribution.

9. The system according to claim 5, wherein the one or more processors are further configured to:
ingest the first manifest and the second manifest listed in a programming schedule into the indexing and storage system;
store a data log of a plurality of indicators indicating at least one of a non-programming content break, program start, program end, or graphic overlays included in the first pre-encoded media asset and the second pre-encoded media asset; and
validate completion of the first pre-encoded media asset and the second pre-encoded media asset so that the first pre-encoded media asset and the second pre-encoded media asset are ready to be included in the disparate live media output stream.

10. The system according to claim 9, wherein the one or more processors are further configured to index the plurality of media segments in the indexing and storage system.

11. A method, comprising:
inserting, by one or more processors, additional information from a second pre-encoded media asset indicated in a second manifest into a live output stream manifest, wherein the live output stream manifest comprises information related to a plurality of media segments from a first pre-encoded media asset indicated in a first manifest;
determine, by the one or more processors, a transition point between one or more first media segments of the plurality of media segments that are from a first data source to one or more second media segments of the plurality of media segments that are from a second data source different from the first data source,
wherein the transition point is based on the additional information; and
generating, by the one or more processors, a disparate live media output stream based on (i) the transition point between the one or more first media segments and the one or more second media segments and (ii) an insertion of the information related to the plurality of media segments from the first pre-encoded media asset indicated in the first manifest into the live output stream manifest at one or more defined intervals,
wherein a defined interval from the defined intervals, for the insertion of the information related to the plurality of media segments from the first pre- encoded media asset indicated in the first manifest into the live output stream manifest, is less than a duration of a previous media segment.

12. The method according to claim 11, wherein the first pre-encoded media asset and the second pre-encoded media asset are listed in a programming schedule, and
wherein the programming schedule is generated by a network scheduler based on at least one of a desired channel theme, content metadata, pre-specified content rights, content availability, content eligibility, or stream operator preferences.

13. The method according to claim 11, further comprising determining, by the one or more processors, the first pre-encoded media asset transmitted to a content delivery system based on availability of the first pre-encoded media asset for media distribution.

14. The method according to claim 11, further comprising accessing, by the one or more processors, an indexing and storage system to retrieve the first pre-encoded media asset based on an index of the first pre-encoded media asset.

15. The method according to claim 13, further comprising, based on a lack of availability of the first pre-encoded media asset for the media distribution:
retrieving, by the one or more processors, media content assets from a media content master storage system based on a programming schedule of a channel from a network scheduler;

retrieving, by the one or more processors, at least one of duration of the media content assets, duration and location of non-programming content break, credits, or overlay opportunities corresponding to the media content assets from a content metadata storage system;

encoding and packaging, by the one or more processors, the retrieved media content assets, wherein the encoding and the packaging comprises:

marking, by the one or more processors, a location of the non-programming content break;

conditioning, by the one or more processors, media assets such that the location of the non-programming content break is adjacent to boundaries of the plurality of media segments; and inserting, by the one or more processors, an indicator to mark the credits and an overlay graphic location in the media content assets based on content metadata, in case of non-inclusion of the indicator in the first pre-encoded media asset at packaging time.

16. The method according to claim 15, further comprising adding, by the one or more processors, an in-band indicator in the media content assets, wherein the in-band indicator indicates markers corresponding to the location of the non-programming content break, the credits, and the overlay graphic location for a protocol that is utilized to determine next media content asset to be downloaded.

17. The method according to claim 15, further comprising storing, by the one or more processors, the encoded and packaged media content assets and associated media content manifest in media storage of the content delivery system for the media distribution.

18. The method according to claim 14, further comprising:

ingesting, by the one or more processors, the first manifest and the second manifest listed in a programming schedule into the indexing and storage system;

storing, by the one or more processors, a data log of a plurality of indicators indicating at least one of a non-programming content break, program start, program end, or graphic overlays included in the first pre-encoded media asset and the second pre-encoded media asset; and validating, by the one or more processors, completion of the first pre-encoded media asset and the second pre-encoded media asset so that the first pre-encoded media asset and the second pre-encoded media asset are ready to be included in the disparate live media output stream.

19. The method according to claim 18, further comprising indexing, by the one or more processors, the plurality of media segments in the indexing and storage system.

20. A non-transitory computer-readable medium having stored thereon, computer executable instruction that when executed by one or more processors, cause the one or more processors to execute operations, the operations comprising:

inserting, into a live output stream manifest comprising information related to a plurality of media segments from a first pre-encoded media asset indicated in a first manifest, additional information from a second pre-encoded media asset indicated in a second manifest;

determine a transition point between one or more first media segments of the plurality of media segments that are from a first data source and one or more second media segments of the plurality of media segments that are from a second data source different from the first data source, wherein the transition point is based on the additional information; and generating a disparate live media output stream based on (i) the transition point between the one or more first media segments and the one or more second media segments and (ii) an insertion of the information related to the plurality of media segments from the first pre-encoded media asset indicated in the first manifest into the live output stream manifest at one or more defined intervals, wherein a defined interval from the one or more defined intervals, for the insertion of the information related to at least the plurality of media segments from the first pre-encoded media asset indicated in the first manifest into the live output stream manifest, is less than a duration of a previous media segment.

21. The system according to claim 1, wherein the one or more defined intervals, at which the insertion of the information further related to one or more events from the first pre-encoded media asset indicated in the first manifest into the live output stream manifest is performed, are less than the duration of the previous media segment.

* * * * *

UNITED STATES PATENT AND TRADEMARK OFFICE
CERTIFICATE OF CORRECTION

PATENT NO. : 11,962,821 B2
APPLICATION NO. : 17/206737
DATED : April 16, 2024
INVENTOR(S) : Donald Jude Loheide et al.

Page 1 of 1

It is certified that error appears in the above-identified patent and that said Letters Patent is hereby corrected as shown below:

In the Claims

In Column 44, Line 40, Claim 11, delete "pre- encoded" and insert -- pre-encoded --, therefor.

Signed and Sealed this
Eighth Day of October, 2024

Katherine Kelly Vidal
*Director of the United States Patent and Trademark Office*